United States Patent
Ahmed et al.

(10) Patent No.: US 9,813,287 B2
(45) Date of Patent: Nov. 7, 2017

(54) CONNECTIVITY-AWARE VIRTUAL NETWORK EMBEDDING

(71) Applicant: Huawei Technologies Canada Co., Ltd., Ottawa (CA)

(72) Inventors: Reaz Ahmed, Waterloo (CA); Jeebak Mitra, Ottawa (CA); Shihabur Chowdhury, Waterloo (CA); Nashid Shahriar, Waterloo (CA); Raouf Boutaba, Waterloo (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 82 days.

(21) Appl. No.: 15/048,573

(22) Filed: Feb. 19, 2016

(65) Prior Publication Data

US 2017/0033976 A1 Feb. 2, 2017

Related U.S. Application Data

(60) Provisional application No. 62/199,150, filed on Jul. 30, 2015, provisional application No. 62/199,507, filed on Jul. 31, 2015.

(51) Int. Cl.
*H04L 12/26* (2006.01)
*H04L 12/24* (2006.01)
*H04L 12/721* (2013.01)

(52) U.S. Cl.
CPC ...... *H04L 41/0668* (2013.01); *H04L 41/0672* (2013.01); *H04L 41/0836* (2013.01); *H04L 41/12* (2013.01); *H04L 45/12* (2013.01)

(58) Field of Classification Search
CPC . H04L 41/0668; H04L 41/12; H04L 41/0836; H04L 41/0672; H04L 45/12
See application file for complete search history.

(56) References Cited

U.S. PATENT DOCUMENTS

| | | | |
|---|---|---|---|
| 2006/0153066 A1* | 7/2006 | Saleh | H04J 14/0295 370/216 |
| 2015/0104166 A1* | 4/2015 | Patel | H04Q 11/0066 398/5 |

FOREIGN PATENT DOCUMENTS

| | | |
|---|---|---|
| CN | 102427420 | 4/2012 |
| EP | 2804343 | 11/2014 |
| JP | 2012169874 | 9/2012 |

OTHER PUBLICATIONS

C. Liu et al.; "A new survivable mapping problem in ip-over-wdm networks by recursive graph contraction"; IEEE JSAC, vol. 25, No. 4, pp. 25-34, Apr. 2007.

A Todimala et al.; "A scalable approach for survivable virtual topology routing in optical wdm networks"; IEEE JSAC, vol. 25, No. 6, pp. 63-69; Aug. 2007.

(Continued)

*Primary Examiner* — Afshawn Towfighi
(74) *Attorney, Agent, or Firm* — Gowling WLG (Canada) LLP

(57) ABSTRACT

Embedding a virtual network onto a physical network may be done in such a manner to ensure that the embedded virtual network maintains connectivity in the event of failure of k links in the physical network. The embedding determines virtual links that must be embedded onto disjoint paths in the physical network and then embeds the virtual network according to ensure the determined virtual links are embedded on disjoint paths.

20 Claims, 21 Drawing Sheets

(56) References Cited

OTHER PUBLICATIONS

Y. Zhu and M.H. Ammar; "Algorithms for assigning substrate network resources to virtual network components"; IEEE Infocom, 2006.
A. Markopoulou et al.; "Characterization of Failures in an IP Backbone"; INFOCOM Mar. 2004.
K. Thulasiraman et al.; "Circuits/cutsets duality and a unified algorithmic framework for survivable logical topology lesign in ip-over-wdm optical networks"; IEEE INFOCOM, Apr. 2009.
K. Lee et al.; "Cross-layer survivability in wdm-based networks"; IEEE/ACM Ton, vol. 19, No. 4, pp. 1000-1013; Aug. 2011.
Z. Zhou et al.; "Cross-layer network survivability under multiple cross-layer metrics"; IEEE/OSA J. of Optical Comm. & Net., vol. 7, No. 6, pp. 540-553; Jun. 2015.
A. Fischer et al.; "Virtual Network Embedding: A Survey"; IEEE CST, vol. 15, No. 4, pp. 1888-1906; Fourth Quarter 2013.
M. Kurant et al; "Survivable routing of mesh topologies in ip-over-wdm networks by recursive graph contraction"; IEEE JSAC, vol. 25, No. 5, pp. 922-933, Jun. 2007.
D. D.-J. Kan et al.; "Lightpath routing and capacity assignment for survivable ip-over-wdm networks"; IEEE DRCN, 2009.
H. Choi et al.; "Loopback recovery from double-link failures in optical mesh networks"; IEEE/ACM Ton, vol. 12, No. 6, pp. 1119-1130; Dec. 2004.
N.M.M.K. Chowdhury et al.; "A survey of network virtualization"; Computer Networks, vol. 54, pp. 862-876; Apr. 2010.
M.R. Rahman et al.; "SVNE: Survivable Virtual Network Embedding Algorithms for Network Virtualization"; IEEE TNSM, vol. 10, No. 2, pp. 105-118, Jun. 2013.
T. Guo et al.; "Shared backup network provision for virtual network embedding"; IEEE ICC, 2011.
S. Herker et al.; "Survey on Survivable Virtual Network Embedding Problem and Solutions"; ICNS, 2013.
E. Modiano et al.; "Survivable lightpath routing: a new approach to the design of wdm-based networks"; IEEE JSAC, vol. 20, No. 4, pp. 800-809, May 2002.
M. Kurant et al.; "Survivable mapping algorithm by ring trimming (smart) for large ip-over-wdm networks"; BroadNets, Oct. 2004.
J. Xu et al.; "Survivable virtual infrastructure mapping in virtualized data centers"; IEEE Cloud, 2012.
P. Gill et al.; "Understanding Network Failures in Data Centers: Mesurement, Analysis, and Implications"; ACM SIGCOMM; Aug. 2011.
Z. Zhou et al.; "Novel survivable logical topology routing in ip-over-wdm networks by logical protecting spanning tree set"; ICUMT, 2012.
Menger's theorem online http://math.fau.edu/locke/menger.htm.
Rodrigo R. Oliveira et al.; No More Backups: Toward Efficient Embedding of Survivable Virtual Networks; 2013 IEEE International Conference on Communications (ICC); pp. 2128-2132; Jun. 13, 2013.
English Abstract of cited reference CN102427420A.
English Abstract of cited reference JP2012169874A.
International Search Report and Written Opinion for International Patent Application No. PCT/CN2016/074346 dated May 3, 2016.

* cited by examiner

CONNECTIVITY-AWARE VIRTUAL NETWORK EMBEDDING

TECHNICAL FIELD

The current application relates to virtual network embedding, and in particular to connectivity-aware virtual network embedding.

BACKGROUND

Network virtualization allows one or more specified networks to be implemented on a substrate network infrastructure. That is, a number of virtual networks may be specified and implemented on a physical network infrastructure. Virtual network embedding provides a mapping between the virtual nodes and virtual links of the virtual network to the physical nodes and physical links or paths of the physical substrate network. In addition to satisfying the virtual node and virtual link requirements, the mapping may also attempt to optimize, or satisfy, other constraints.

Virtual network embedding allows a plurality of virtual nodes and virtual links to be implemented in available physical resources. However, it is possible that the virtual network embedding results in a mapping that leaves the virtual network vulnerable to disconnection as a result of a physical link failure, which would render the virtual network, or a portion of the virtual network, unusable. The defined virtual network may experience connectivity issues due to the failure of a physical link. While it is possible to determine a mapping that maintains connectivity between virtual nodes in the event of a single physical link failure, the problem increases in complexity quickly as more link-failure resilience is desired and the number of virtual nodes is increased, particularly when other criteria are taken into account, such as efficient use of physical network resources.

It is desirable to provide a virtual network embedding technique capable of providing a mapping that can maintain virtual network connectivity in the event of multiple physical link failures.

SUMMARY

In accordance with the present disclosure there is provided a method for embedding a virtual network definition defining a virtual network comprising a plurality of virtual nodes and a plurality of virtual links on a physical network, the method comprising: determining a conflicting set for each virtual link of the virtual network definition, each conflicting set comprising a plurality of virtual links of the virtual network that must be embedded on disjoint paths in the physical network to maintain connectivity of the virtual network in the presence of k physical link failures; and embedding the virtual network onto the physical network so that each of the plurality virtual links in each conflicting set are embedded on disjoint paths of the physical network.

In accordance with a further embodiment, the method further comprises augmenting the virtual network definition by adding parallel virtual links between virtual nodes so that each of the virtual nodes comprises at least k+1 virtual links.

In accordance with a further embodiment of the method, the parallel virtual links are added when determining the conflicting set for each virtual link.

In accordance with a further embodiment of the method, augmenting the virtual network definition and determining the conflicting set comprises: selecting an initial virtual node as a protected component; selecting a virtual node outside of the protected component having a virtual link to a virtual node inside the protected component; attempting to determine k+1 edge-disjoint shortest paths from the protected component to the selected virtual node; if k+1 edge-disjoint shortest paths are determined: adding the selected virtual node to the protected component; updating the conflicting set of the virtual link between the selected virtual node and the virtual node inside the protected component to include all virtual links in the k+1 edge-disjoint shortest paths; and removing all of the virtual links in the k+1 edge-disjoint shortest paths from further consideration in augmenting the virtual network definition and determining the conflicting set; if k+1 edge-disjoint shortest paths are not determined: adding n parallel virtual links between the selected virtual node and the virtual node inside the protected component to provide k+1 edge-disjoint shortest paths, where n=k+1−(number of determined edge-disjoint shortest paths); adding the selected virtual node to the protected component; updating the conflicting set of the virtual link between the selected virtual node and the virtual node inside the protected component to include all virtual links in the determined edge-disjoint shortest paths and the n parallel virtual links; removing all of the virtual links in the determined edge-disjoint shortest paths and the n parallel virtual links from further consideration in augmenting the virtual network definition and determining the conflicting set; and selecting a next virtual node outside of the protected component having a virtual link to a virtual node inside the protected component.

In accordance with a further embodiment of the method, determining the conflicting set for each of the virtual links comprises determining the conflicting set for each of the virtual links using an optimal cut-set approach.

In accordance with a further embodiment of the method, determining the embedding comprises using an integer linear programming (ILP) formulation to determine the embedding.

In accordance with a further embodiment of the method, determining the embedding comprises using a heuristic approach to determine the embedding.

In accordance with a further embodiment of the method, the heuristic approach comprises: sorting in decreasing order the virtual nodes according to a sum of conflicting set size of each virtual link incident upon the respective virtual node; mapping virtual nodes and virtual links of the virtual network definition to the physical network beginning with the virtual nodes having the largest sum of conflicting set size.

In accordance with a further embodiment of the method, each virtual link incident upon a virtual node is mapped to the physical network in a decreasing order of the conflicting set size of each one of the virtual links.

In accordance with a further embodiment, the method further comprises receiving the virtual network definition as a virtual network request for embedding onto the physical network.

In accordance with the present disclosure there is provided a system for embedding a virtual network on a physical network, the system comprising: a processing unit for executing instructions; and a memory unit for storing instructions, which when executed by the processor configure the system to perform steps for: determining a conflicting set for each virtual link of a virtual network definition defining the virtual network comprising a plurality of virtual nodes and a plurality of virtual links, each conflicting set comprising a plurality of virtual links of the virtual network that must be embedded on disjoint paths in the physical network to maintain connectivity of the virtual network in the presence of k physical link failures; and embedding the virtual network onto the physical network so that each of the plurality virtual links in each conflicting set are embedded on disjoint paths of the physical network.

In accordance with a further embodiment of the system, the instructions configure the system to further perform steps for augmenting the virtual network definition by adding parallel virtual links between virtual nodes so that each of the virtual nodes comprises at least k+1 virtual links.

In accordance with a further embodiment of the system, the parallel virtual links are added when determining the conflicting set for each virtual link.

In accordance with a further embodiment of the system, augmenting the virtual network definition and determining the conflicting set comprises: selecting an initial virtual node as a protected component; selecting a virtual node outside of the protected component having a virtual link to a virtual node inside the protected component; attempting to determine k+1 edge-disjoint shortest paths from the protected component to the selected virtual node; if k+1 edge-disjoint shortest paths are determined: adding the selected virtual node to the protected component; updating the conflicting set of the virtual link between the selected virtual node and the virtual node inside the protected component to include all virtual links in the k+1 edge-disjoint shortest paths; and removing all of the virtual links in the k+1 edge-disjoint shortest paths from further consideration in augmenting the virtual network definition and determining the conflicting set; if k+1 edge-disjoint shortest paths are not determined: adding n parallel virtual links between the selected virtual node and the virtual node inside the protected component to provide k+1 edge-disjoint shortest paths, where n=k+1−(number of determined edge-disjoint shortest paths); adding the selected virtual node to the protected component; updating the conflicting set of the virtual link between the selected virtual node and the virtual node inside the protected component to include all virtual links in the determined edge-disjoint shortest paths and the n parallel virtual links; removing all of the virtual links in the determined edge-disjoint shortest paths and the n parallel virtual links from further consideration in augmenting the virtual network definition and determining the conflicting set; and selecting a next virtual node outside of the protected component having a virtual link to a virtual node inside the protected component.

In accordance with a further embodiment of the system, determining the conflicting set for each one of the virtual links comprises determining the conflicting set for each one of the virtual links using an optimal cut-set approach.

In accordance with a further embodiment of the system, determining the embedding comprises using an integer linear programming (ILP) formulation to determine the embedding.

In accordance with a further embodiment of the system, determining the embedding comprises using a heuristic approach to determine the embedding.

In accordance with a further embodiment of the system, the heuristic approach comprises: sorting in decreasing order the virtual nodes according to a sum of conflicting set size of each virtual link incident upon the respective virtual node; mapping virtual nodes and virtual links of the virtual network definition to the physical network beginning with the virtual nodes having the largest sum of conflicting set size.

In accordance with a further embodiment of the system, each virtual link incident upon a virtual node is mapped to the physical network in a decreasing order of the conflicting set size of each one of the virtual links.

In accordance with a further embodiment of the system, the instructions configure the system to further perform steps for receiving the virtual network definition as a virtual network request for embedding onto the physical network.

BRIEF DESCRIPTION OF THE DRAWINGS

Embodiments are described herein with reference to the appended drawings, in which.

DETAILED DESCRIPTION

Figure 1:
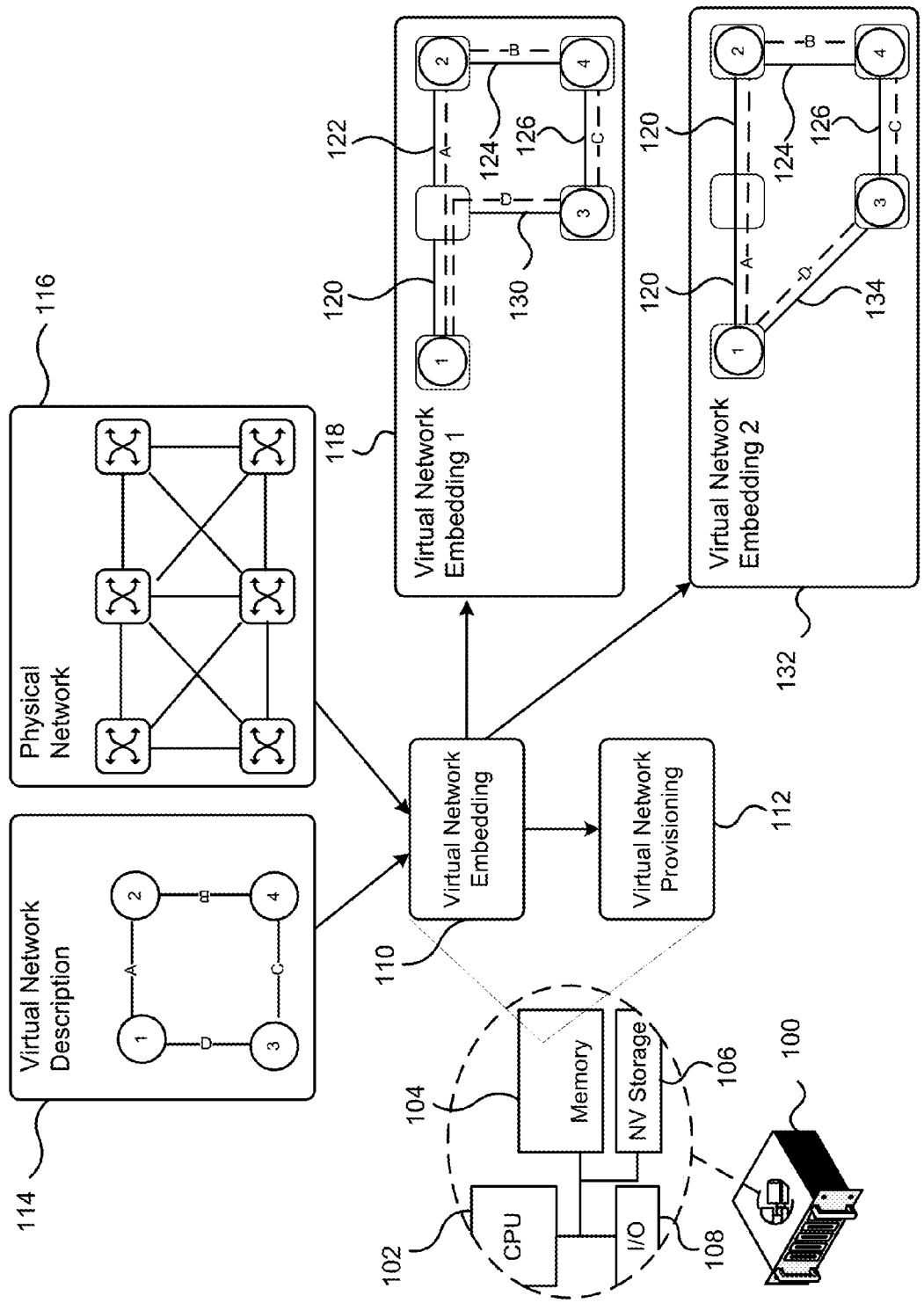
FIG. 1 depicts a system and process for connectivity-aware virtual network embedding.

A connectivity-aware virtual network embedding approach described below may maintain connectivity of the virtual network in the event of a number of link failures in a substrate, or physical, network. For any virtual network configuration it should be considered that over the life of the virtual network, substrate network resources may fail. It is desirable that failures of components in the substrate network do not affect the ability of the virtual network to maintain connectivity. For example if one link failure in the substrate network results in multiple virtual link failures in the embedded virtual network, the connectivity of the virtual network may be lost. It may be possible to over-provision the virtual network on the substrate network such that even if a substrate network component fails, all of the virtual links can be maintained. Such over-provisioning may increase costs for maintaining and operating the physical infrastructure as more physical components are required to provide the over-provisioning. Alternatively, it may be possible to find a virtual network embedding that can maintain the overall virtual network connectivity in the presence of one or more substrate link failures.

Finding a virtual network embedding that can survive substrate network node and/or link failures is termed herein "a survivable virtual network embedding problem". One approach for survivable virtual network embedding is to allocate redundant bandwidth for each virtual link, or selected virtual links requiring redundancy, which may be done proactively while computing the mapping. In contrast to allocating redundant bandwidth, connectivity-aware virtual network embedding attempts to provide a virtual network embedding that ensures connectivity in a virtual network topology in the presence of one or more substrate link failures. The desired amount of protection against link failures can vary. For example, one virtual network may be embedded in a manner that maintains connectivity in the event of a single substrate link failure, while a second virtual network may be embedded in a manner that maintains connectivity in the event of two substrate link failures. Because such an embedding does not protect each virtual link with dedicated backup in the substrate network, some substrate link failures will result in virtual link failures in the virtual network. However, the virtual network embedding may maintain the virtual network connectivity, and as such the virtual network operator can reroute traffic from failed virtual links based on customer priority using, for example, the OPENFLOW™ protocol standard of the Open Networking Foundation. Compared to provisioning virtual links with backup in the physical layer, the connectivity-aware virtual network embedding can reduce resource overhead in the substrate network.

As described further below, it may be possible to provide a k-protected virtual network embedding, which is a virtual network embedding that maintains connectivity in the event of k substrate network link failures. Such multiple link failure may not be a rare event in large transport networks. Repairing a failed link, for example as a result of a cut or damaged fiber, may take a long time. The probability of a second, concurrent link failure is not negligible given the high Mean-Time-to-Repair (MTTR). Further, some inter-datacenter links destined to different geographical locations may be physically routed together for some distance, and a backhaul failure may cause multiple physical links to fail.

FIG. 1 depicts a system and process for connectivity-aware virtual network embedding. The system may comprise one or more computing devices, represented as a single server 100. Although depicted as a single server, the system may be implemented as one or more real or virtual servers. Regardless of the particular implementation, the server 100 includes a processing unit 102 for executing instructions and a memory 104 for storing instructions, as well as data. The server 100 may further comprise non-volatile storage 106 for providing storage of both instructions and data for long periods of time. Further, the server may include one or more input/output interfaces 108 that allow the server to interact with users and/or other systems. For example, the I/O interfaces 108 or devices may include keyboards, mice, monitors, network interfaces, etc. The instructions stored in memory configure the server 100 to provide virtual network embedding functionality 110 and virtual network provisioning functionality 112. Broadly, the virtual network embedding functionality 110 receives a virtual network definition, which may comprise the desired connectivity topology, constraints on where virtual nodes can be embedded, as well as bandwidth requirements for each link, and determines a mapping of the virtual network to the physical network, or substrate network, that satisfies the constraints. Once the mapping is determined, the mapping may be used to implement the virtual network within the physical network.

A virtual network 114 may be implemented on a physical network 116. As depicted, the virtual network 114 comprises four virtual nodes 1, 2, 3, 4, identified by a number in a circle, and four virtual links labelled as A, B, C, D. In the virtual network, connectivity may be maintained in the event of a single virtual link failure. For example, if virtual link A fails, virtual node 1 may still communicate with virtual node 2 over the path of virtual links D-C-B. The virtual network embedding functionality 110 may determine a mapping of the virtual network 114 to available physical resources of the physical network 116. A first illustrative virtual network embedding 118 is depicted that is not connectivity-aware and does not maintain connectivity in the event of a single substrate link failure. Each virtual node 1, 2, 3, 4 is embedded on a separate physical node. Each virtual link is provided by one or more physical links. In particular, virtual link A is provided by the physical links 120 and 122, along with the intervening physical node. Virtual link D is provided by physical links 120 and 130, along with the intervening physical node. As depicted, virtual links B and C are provided on separate respective physical links 124 and 126. If one of the physical links 124, 126 fails, only one virtual link will fail and connectivity will be maintained. However, as depicted virtual link A and virtual link D are both embedded on the same physical link 120. Accordingly, if the physical link 120 fails, both virtual links A and D will fail, and connectivity of node 1 to the rest of the virtual network will be lost. Therefore, the virtual network embedding 118 is not 1-protected.

FIG. 1 further depicts a second virtual network embedding 132 that is connectivity aware and maintains the connectivity of the virtual network in the event of a single physical link failure. As depicted, each virtual link A, B, C, D is mapped to a separate disjoint physical link, so that a single physical link failure will only result in a single virtual link failure, and network connectivity can be maintained. In contrast to the first virtual network embedding 118 in which virtual links A and D are embedded on the same physical link 120, the second virtual network embedding 132 embeds virtual links A and D on separate physical links 120, 134 respectively.

The connectivity-aware second virtual network embedding 132 described above is a simple virtual network embedding, with the virtual network surviving only a single link failure and the number of virtual nodes and virtual links being relatively low. As the desired number of survivable link failures increases to two or more, and the number of nodes increases, for example to 10, 20, 50 or more, the complexity of providing a mapping that ensures the desired connectivity increases rapidly. The physical network will typically not have enough resources to provide two unique physical links for each virtual link. The connectivity-aware virtual network embedding described herein can determine a mapping of a virtual network that can maintain connectivity in the event of two or more physical link failures, even as both physical and virtual network sizes scale upwards.

Although FIG. 1 depicts the virtual network and physical networks visually, as the number of virtual and physical nodes/links increases, it becomes difficult to provide meaningful visual representations. Accordingly, graph notation and techniques are used when describing the connectivity-aware virtual network embedding, which is intended to function with a large number of nodes and two or more link failures.

A physical network may be described by an undirected graph $G=(V, E)$, where V represents the set of physical nodes (switches/routers) and E represents physical links. The set of neighbors of a physical node u∈V is denoted by N(u). The bandwidth capacity of a particular physical link (u, v)∈E is denoted by $b_{uv}$, and the cost for allocating one unit of bandwidth in (u, v) is $C_{uv}$. A path between two physical nodes u, and v, may comprise one or more physical links and is denoted by $Q^{uv}$.

A virtual network may be represented as an undirected graph $\overline{G}=(\overline{V}, \overline{E})$, where $\overline{V}$ and $\overline{E}$ are sets of virtual nodes and virtual links, respectively. The neighbor of a virtual node is denoted by $N(\overline{u})$. Each of the virtual links $(\overline{u}, \overline{v})\in\overline{E}$ may have a particular bandwidth requirement denoted by $b_{\overline{uv}}$. Each virtual node $\overline{u}\in\overline{V}$ has an associated location constraint $L(\overline{u})\subseteq V$, that denotes the set of physical nodes where $\overline{u}$ may be embedded. $p^{\overline{uv}}$ is a single path between the virtual nodes $\overline{u}$ and $\overline{v}$ and $P^{\overline{uv}}$ is a set of edge-disjoint paths between $\overline{u}$ and $\overline{v}$.

As described further below, a received virtual network may need to be augmented with additional virtual links in order to provide a k-protected virtual network. The k-protected virtual network may be represented by $\hat{G}=(\hat{V}, \hat{E})$, where $\hat{V}=\overline{V}$, and $\hat{E}=\overline{E}\cup\tilde{E}$, where $\tilde{E}$ is a set of virtual links that have been added to the virtual network definition in order to provide the desired k-protection. A k-protected component of $\overline{G}$ is a multi-graph $\hat{G}_k=(\hat{V}_k, \hat{E}_k)$, where $\hat{V}_k\subseteq \overline{V}$, $\hat{E}_k=\overline{E}_k\cup\tilde{E}_k$, $\overline{E}_k\subseteq\overline{E}$, $\tilde{E}_k\subseteq\tilde{E}$ and $\tilde{E}_k$ is a set of virtual links augmented in such a way that simultaneous removal of k arbitrate virtual links in $\hat{G}_k$ does not partition $\hat{G}_k$.

A k-protected component $\hat{G}_k$ of a virtual network may be expanded by adding a virtual node $\hat{v}$ to $\hat{G}_k$ where $\hat{v}\in\hat{V}\backslash\hat{V}_k$ and $\exists\hat{u}\in\hat{V}_k$, $\hat{v}\in N(\hat{u})$. An expansion operator $\odot$ may be defined as $\hat{G}_k\odot\hat{v}=(\hat{V}_k\cup\{\hat{v}\}, \hat{E}_k\cup\{(\hat{u}, \hat{v})|\hat{u}\in\hat{V}_k, \hat{u}\in N(\hat{v})\})$. A set of edge-disjoint shortest paths between a protected component $\hat{G}_k$ and a virtual node $\hat{v}\in\hat{V}\backslash\hat{V}_k$ is defined as $\mathcal{P}^{\hat{G}_k\hat{v}}=\{p_i^{\hat{x}\hat{v}}\}$ where $\hat{x}\in\hat{V}_k$ and all $p_i^{\hat{x}\hat{v}}$ terminate in the first encountered virtual node within $\hat{V}_k$, that is the only virtual node from $\hat{V}_k$ that is on $p_i^{\hat{x}\hat{v}}$ is $\hat{x}$.

As described further below, in determining a connectivity aware virtual network embedding, a conflicting set is determined for each virtual link. Two virtual links are considered as conflicting if they must be embedded on edge-disjoint substrate paths in order to ensure k+1 edge connectivity. A conflicting set, denoted by $\chi^{\hat{u}\hat{v}}$, of a virtual link $(\hat{u}, \hat{v})$ is the set of virtual links in $\hat{E}$ that are conflicting with virtual link $(\hat{u}, \hat{v})$. A conflicting set of a virtual network $\hat{G}$, denoted by $\chi^{\hat{G}}$ is defined as $\chi^{\hat{G}}=\cup_{\forall(\hat{u},\hat{v})\in\hat{E}}\chi^{\hat{u}\hat{v}}$.

Figure 2:
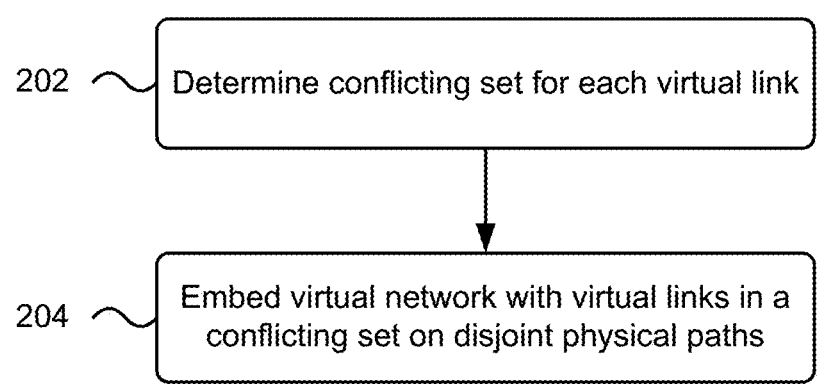
FIG. 2 depicts a method for connectivity-aware virtual network embedding.

FIG. 2 depicts a method 200 for embedding a virtual network. Embedding a virtual network $\overline{G}=(\overline{V}, \overline{E})$ with location constraints $L(\overline{u})$ for all $\overline{u}\in\overline{V}$ onto a physical network $G=(V, E)$ provides a function $f: \overline{V}\rightarrow V$ that maps every virtual node to a physical node while satisfying the location constraint without any overlap. The embedding provides a function g: $\overline{E}\rightarrow 2^E$ that maps each virtual link to a substrate path with sufficient bandwidth capacity and ensures the connectivity in $\overline{G}$ in the presence of k physical link failures in G while minimizing the total cost of embedding in terms of bandwidth consumption.

The method 200 assumes that the requested virtual network is k-protected. If the virtual network is not k-protected, the virtual network may be augmented in order to be k-protected. A k-protected virtual network $\hat{G}=(\hat{V}, \hat{E})$ can maintain connectivity between nodes in the event of k link failures. In order to remain connected in presence of k link failures in the physical network, the embedding algorithm must ensure k+1 edge connectivity between physical nodes $f(\hat{u})$ and $f(\hat{v})$ for every pair of virtual nodes $\hat{u}\in\hat{V}$ and $\hat{v}\in\hat{V}$ of the k-protected virtual network $\hat{G}$. This can be achieved if the virtual links of every edge-cut in $\hat{G}$ are embedded on at least k+1 edge-disjoint paths in G. In order to embed the virtual links, the method determines a conflicting set for each virtual link at step 202. Each conflicting set comprises one or more virtual links of the virtual network that must be embedded on disjoint paths in the physical network to maintain connectivity of the virtual network in the presence of k physical link failures.

Once the conflicting sets have been determined, the virtual network is embedded onto the physical network at step 204 so that each of the plurality virtual links in each conflicting set are embedded on disjoint paths of the physical network. When embedding the virtual network, each virtual link that is in the same conflicting set is embedded onto disjoint physical paths within the substrate network. Virtual links that are not in the same conflicting set may be embedded along the same physical path, or a portion of the same physical path.

Figure 3:
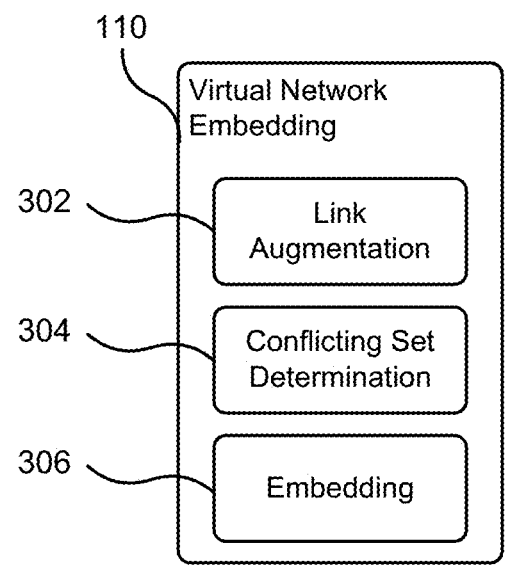
FIG. 3 depicts functional components for connectivity-aware virtual network embedding.

FIG. 3 depicts functional components for connectivity-aware virtual network embedding functionality. As depicted, the connectivity-aware virtual network embedding functionality 110, described above with reference to FIG. 1, may include link augmentation functionality 302 for augmenting a virtual network to a k-protected virtual network, conflicting set determination functionality 304 for determining conflicting sets for virtual links and virtual network embedding functionality 306 for embedding the augmented virtual network using the conflicting sets. Although depicted visually as separate functional components, it is possible for the functionality to be combined together. For example, the link augmentation provided by the link augmentation functionality 302 and the determination of the conflicting set provided by the conflicting set determination functionality 304 may occur at the same time or be part of the same functional component, so that as a link is augmented, the conflicting set is determined or updated. The details of each of the components are described further below.

Figure 4:
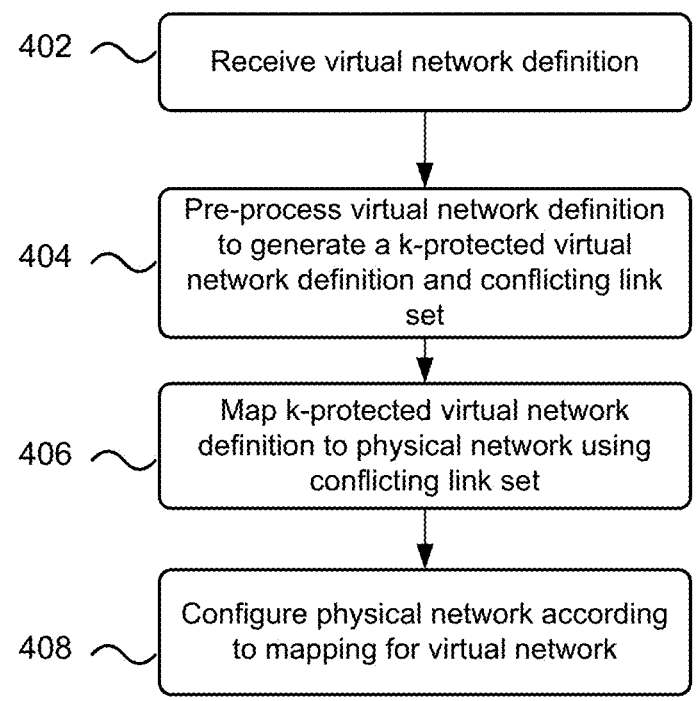
FIG. 4 depicts a method of determining a virtual network mapping according to connectivity-aware virtual network embedding.

FIG. 4 depicts a method 400 of determining a virtual network mapping according to connectivity-aware virtual network embedding. The method 400 receives a virtual network definition in a step 402 and pre-processes the virtual network definition in a next step 404. The pre-processing step 404 may augment the received virtual network, if necessary, in order to provide a k-protected virtual network if the received virtual network is not already k-protected. In addition to augmenting the virtual network if necessary, the pre-processing step 404 also determines a conflicting link set for each virtual link. The k-protected virtual network definition is mapped to the physical network using the conflicting link sets in a step 406. The conflicting link sets may be satisfied by mapping each virtual link in the same conflicting link set to disjoint paths in the physical network. Once the mapping is completed, the physical network may be configured according to the mapping in a step 408.

As described above, the connectivity-aware virtual network embedding may be viewed as having two phases. The first phase may be considered a pre-processing phase, during which the requested virtual network is augmented with parallel links as necessary to ensure each virtual node has at least k+1 virtual links for k-link failure survivability. For example, to survive 2 simultaneous link failures in the substrate network, each virtual node requires at least 3 virtual links. Accordingly, if a virtual node only has 2 incident virtual links, a $3^{rd}$ virtual link will be added. The pre-processing also generates conflicting sets for each of the virtual links. A conflicting set is a set of conflicting links for a virtual link. Two virtual links may be considered conflicting links if they must be embedded on edge disjoint substrate paths in order to ensure k+1 edge connectivity. That is, conflicting links cannot share a physical link in their embeddings.

Figure 5:
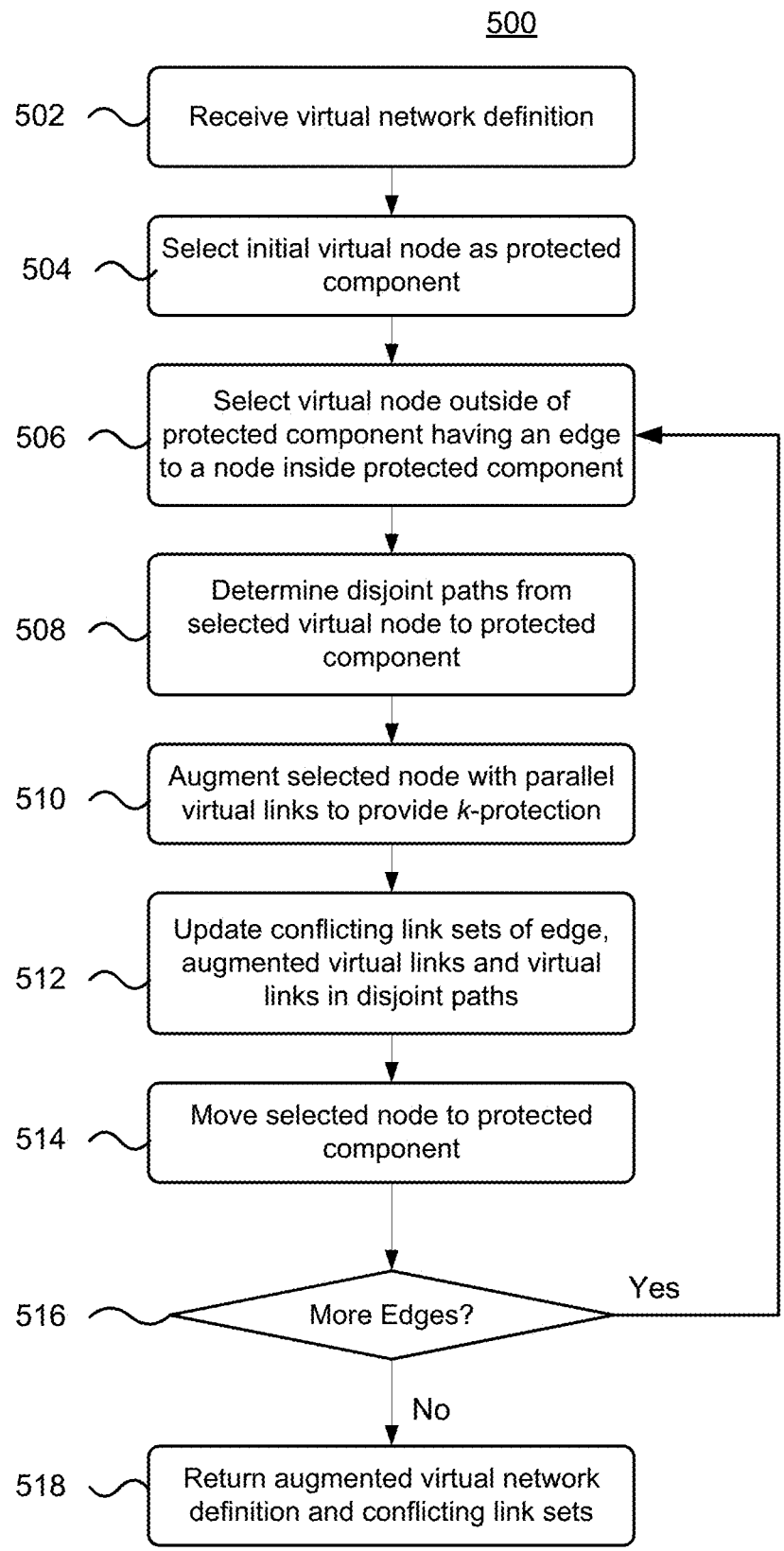
FIG. 5 depicts a method for pre-processing of virtual network definitions.

FIG. 5 depicts a method 500 for pre-processing of virtual network definitions. The method 500 receives a virtual network definition in a step 502 and selects an initial virtual node as a protected component in a step 504. The selection of the initial virtual node may be done arbitrarily. Once the protected component is initialized, a virtual node outside of the protected component that has an edge to a virtual node within the protected component is selected in a step 506 and the number of disjoint paths, if any, from the selected virtual node to the protected component, or more particularly to any virtual node within the protected component, is determined in a step 508. The selected virtual node may then be augmented with parallel virtual links to provide k-protection in a step 510. The number of disjoint paths, including the edge from the virtual node to the protected component and any parallel virtual links, must be greater than or equal to k+1. Once the parallel links are added, if required, the conflicting links set of the edge, the conflicting links set of any augmented virtual links, and the conflicting links set of all the virtual links in the disjoint paths are updated in a step 512. Once the conflicting link sets have been updated, the selected virtual node is moved to within the protected component in a step 514. It is determined whether there are more edges to virtual nodes outside the protected component in a step 516 and if there are, (Yes at step 516) a next virtual node is selected in a step 506. If there are no further edges (No at step 516), the augmented virtual network definition, which includes the virtual network definition with the added parallel virtual links, along with the conflicting sets, may be returned in a step 518 and used for subsequent configuration of the physical network.

Once the links have been augmented and conflicting sets determined, the augmented k-protected virtual network may be embedded onto the physical network. The embedding may be done using an integer linear programming (ILP) approach or a heuristic approach. Regardless, the embedding computes the virtual node embeddings that satisfy location constraints and computes the virtual link embedding so that a virtual link and any other virtual link present in its conflicting set are embedded on disjoint paths.

In order to survive k physical link failures, a virtual network must be k+1 edge connected. That is, for every node, there must be at least k+1 links. This is evident in the virtual network of FIG. 1, which can survive a single link failure, and as such each node has two links. Similarly, in order to survive two arbitrary link failures, each virtual node requires at least three virtual links. However, not all virtual networks may have the required number of virtual links for each virtual node. Accordingly, the virtual network embedding augments the virtual network with additional virtual links. Although other techniques of adding links are possible, such as randomly augmenting links to provide the required connectivity, the connectivity-aware virtual network embedding described herein uses parallel virtual links for augmenting the virtual network. Although parallel virtual link augmentation may not be minimal in terms of resource usage, it does not change the virtual network topology, which can be desirable from the perspective of the virtual network user or administrator.

Figure 6:
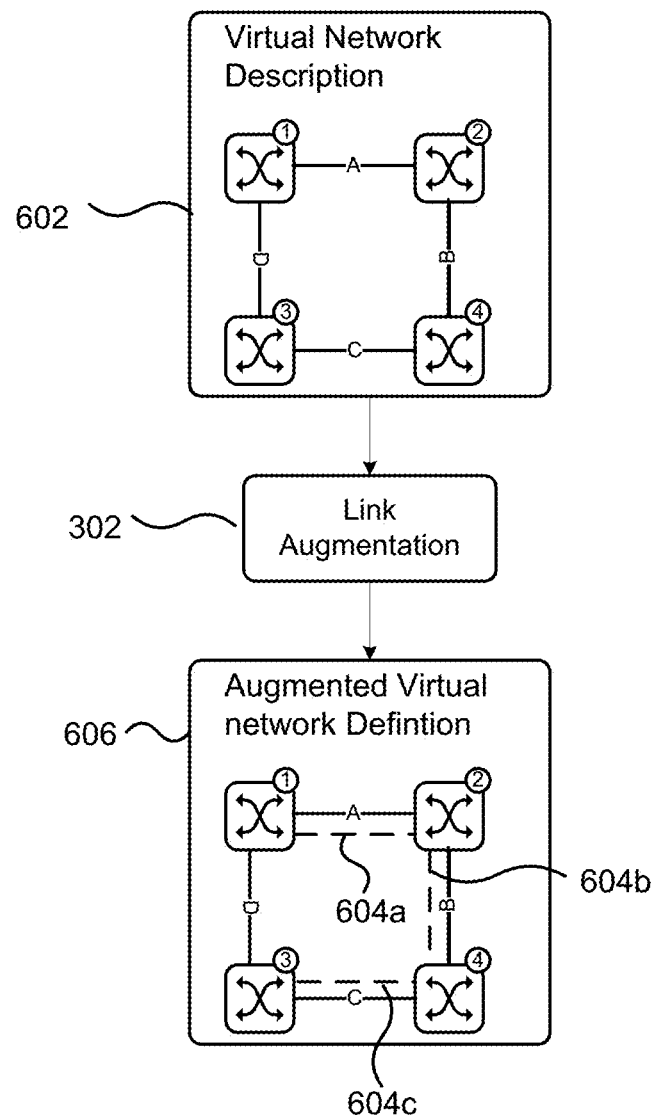
FIG. 6 depicts a link augmentation process.

FIG. 6 depicts a link augmentation process. As depicted, the link augmentation functionality 302 may receive a virtual network description 602. The depicted requested virtual network is 2-edge connected. The link augmentation functionality 302 adds additional virtual links 604a, 604b, 604c that are parallel to existing virtual links so that a resulting augmented virtual network 606 is 3-edge connected, that is each virtual node has at least 3 virtual links.

Figure 7:
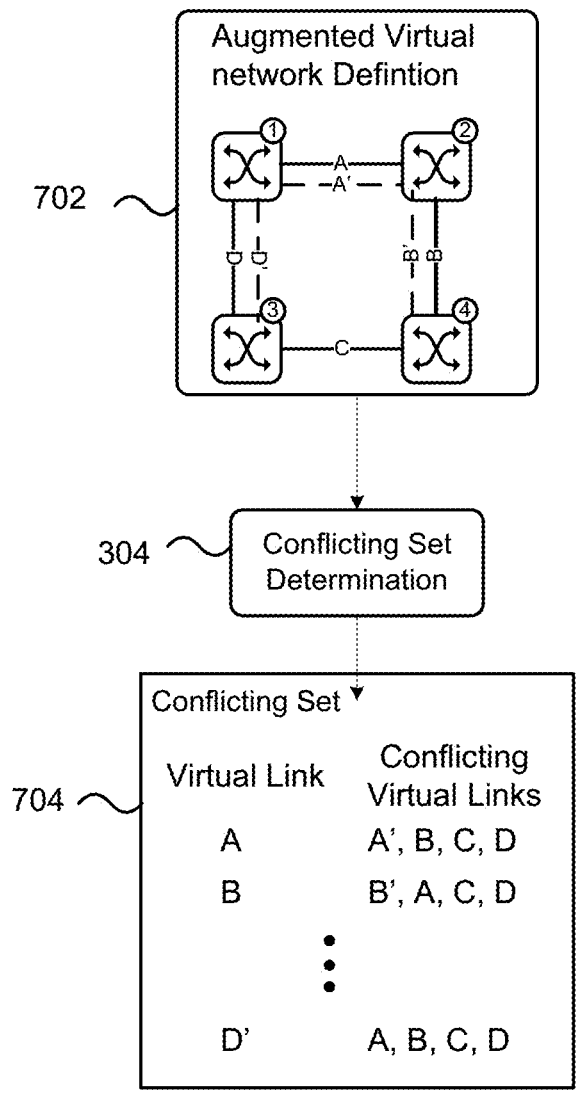
FIG. 7 depicts determining a conflicting set.

FIG. 7 depicts determining a conflicting set. As depicted the conflicting set determination functionality 304 may receive an augmented virtual network definition 702 and provide a conflicting set 704 of all of the conflicting links for each of the virtual links. Although depicted as proceeding separately from the link augmentation, as described further below, the conflicting set determination may be done as the parallel virtual links are added.

As depicted in FIGS. 6 and 7, the link augmentation process may be performed prior to determining conflicting link sets of the virtual links. The link augmentation and conflicting link set determination may be performed together. A heuristic function may be used to compute conflicting link sets for virtual links present in a spanning tree of the virtual network $\overline{G}$ in a reasonable amount of time. In addition to computing the conflicting link sets, the heuristic function also performs link augmentation to ensure that $\overline{G}$ is k-protected. One particular implementation of the heuristic function, referred to as COMPUTE-CONFLICTING-SETS, is detailed in pseudo-code below. It will be appreciated that the link augmentation and conflicting set determination may be achieved by other implementations.

```
01: function COMPUTE-CONFLICTING-SETS($\overline{G}$)
02:     $\forall (\overline{u}, \overline{v}) \in \overline{E}: \chi^{\overline{uv}} \leftarrow \emptyset, Q \leftarrow \emptyset$
03:     $\exists \overline{v} \in \overline{V}: \hat{G}_k \leftarrow (\{\overline{v}\}, \emptyset)$  //$\overline{v}$ is an arbitrary virtual node
04:     ENQUEUE(Q, $\overline{v}$)
05:     while Q is not empty do
06:         $\overline{u} \leftarrow$ DEQUEUE(Q)
07:         for all $\overline{v} \in N (\overline{u})$ and $\overline{v} \notin \hat{G}_k$ do
08:             $\mathcal{P}^{\hat{G}_k \overline{v}} \leftarrow$ COMPUTE-EDSP($\overline{G}, \hat{G}_k, \overline{u}, \overline{v}, k + 1$)
09:             for i = 1 $\rightarrow$ (k + 1 $- |\mathcal{P}^{\hat{G}_k \overline{v}}|$) do
10:                 $\overline{E} \leftarrow \overline{E} \cup (\overline{u}, \overline{v})^i, \mathcal{P}^{\hat{G}_k \overline{v}} \leftarrow \mathcal{P}^{\hat{G}_k \overline{v}} \cup (\overline{u}, \overline{v})^i$
11:             end for
12:             $\forall (\overline{x}, \overline{y}) \in p_i^{\hat{G}_k \overline{v}}, p_i^{\hat{G}_k \overline{v}} \in \mathcal{P}^{\hat{G}_k \overline{v}}:$
13:                 $\chi^{\overline{xy}} \leftarrow \chi^{\overline{xy}} \cup \{(\overline{s}, \overline{t}) \in p_j^{\hat{G}_k \overline{v}} | p_j^{\hat{G}_k \overline{v}} \in \mathcal{P}^{\hat{G}_k \overline{v}} \wedge i \neq j\}$
14:             $\hat{G}_k \leftarrow \hat{G}_k \odot \overline{v}$
15:             ENQUEUE(Q, $\overline{v}$)
16:         end for
17:     end while
18:     return $\chi^{\overline{G}}$
19: end function
```

The function begins with a k-protected component $\hat{G}_k$ containing an arbitrary virtual node $\overline{u} \in \overline{V}$. The function tries to repeatedly add all of the neighbors of $\overline{u}$, $\overline{v} \in N(\overline{u})$ to the protected component $\hat{G}_k$ until all of the virtual nodes of $\overline{G}$ have been added to the protected component $\hat{G}_k$. As described above, a k-protected component of $\overline{G}$ is a multi-graph $\hat{G}_k = (\hat{V}_k, \hat{E}_k)$ such that $\hat{G}_k$ remains connected in the presence of up to k physical link failures. For each neighboring virtual node $\overline{v}$, the function computes k+1 edge disjoint shortest paths (EDSPs), denoted $\mathcal{P}^{\hat{G}_k \overline{v}}$, between the k-protected component $\hat{G}_k$ and the currently selected virtual node $\overline{v}$.

The EDSPs may be calculated in various ways. For example, the EDSPs could be calculated by a function COMPUTE-EDSP that initially adds the virtual link $(\overline{u}, \overline{v})$ to $\mathcal{P}^{\hat{G}_k \overline{v}}$ as the first shortest path $p_1^{\hat{G}_k \overline{v}}$. The function may then use a shortest path algorithm, such as Dijkstra's shortest path algorithm, to compute up to k additional shortest paths $p_i^{\hat{G}_k \overline{v}}$ for i=2 to k+1, where $p_i^{\hat{G}_k \overline{v}}$ is the $i^{th}$ shortest path between $\hat{G}_k$ and $\hat{v}$. After each shortest path $p_i^{\hat{G}_k \overline{v}}$ is computed, all of the virtual links present in $p_i^{\hat{G}_k \overline{v}}$ are removed from $\overline{G}$ in order to ensure the edge-disjointness of subsequent paths. COMPUTE-EDSP returns up to k+1 EDSPs. If the number of EDSPs returned by COMPUTE-EDSP is less than k+1, the COMPUTE-CONFLICTING-SETS function adds k+1-$\mathcal{P}\ \mathcal{P}^{\hat{G}_k\hat{v}}\mathcal{P}$ parallel virtual links between û and v̂. The $i^{th}$ parallel link is denoted by $(\hat{u}, \hat{v})^i$ and provides the $(\mathcal{P}\ \mathcal{P}^{\hat{G}_k\hat{v}}\mathcal{P}+i)^{th}$ EDSP between the protected component $\hat{G}_k$ and v̂. Once the links have been augmented, the conflicting sets of the virtual links are updated. The conflicting set $\chi^{\hat{x}\hat{y}}$ for each virtual link $(\hat{x}, \hat{y})$ in each one of the k+1 shortest paths $p_i^{\hat{G}_k\hat{v}} \in \mathcal{P}^{\hat{G}_k\hat{v}}$ are updated with each virtual link $(\hat{s}, \hat{t})$ from the other shortest paths $p_j^{\hat{G}_k\hat{v}} \in \mathcal{P}^{\hat{G}_k\hat{v}} \wedge i \neq j$. Once the conflicting sets are updated, the protected component is expanded, $\hat{G}_k \leftarrow \hat{G}_k \odot \hat{v}$, in order to include the selected virtual node and the processing repeats with selection of a virtual node outside of the protected component.

In general, there are three cases for parallel virtual link augmentation regardless of the number of link failures that may need to be survived. One case is that there are enough disjoint paths to provide the desired link failure protection and so no additional parallel links need to be added. In order to provide protection against k simultaneous substrate link failures, at least k+1 disjoint paths are required. The second case is that there is at least one disjoint path, but not enough to provide the desired protection in which case one or more, but less than k+1, parallel virtual links need to added. The third case is that there are no disjoint paths between the virtual node and the protected component in which case k parallel virtual links need to be added in order to provide protection against k link failures in the substrate.

Once the link augmentation and conflicting link set determination has completed, the virtual network, or more particularly, the augmented k-protected virtual network may be embedded on the physical network.

Figure 8:
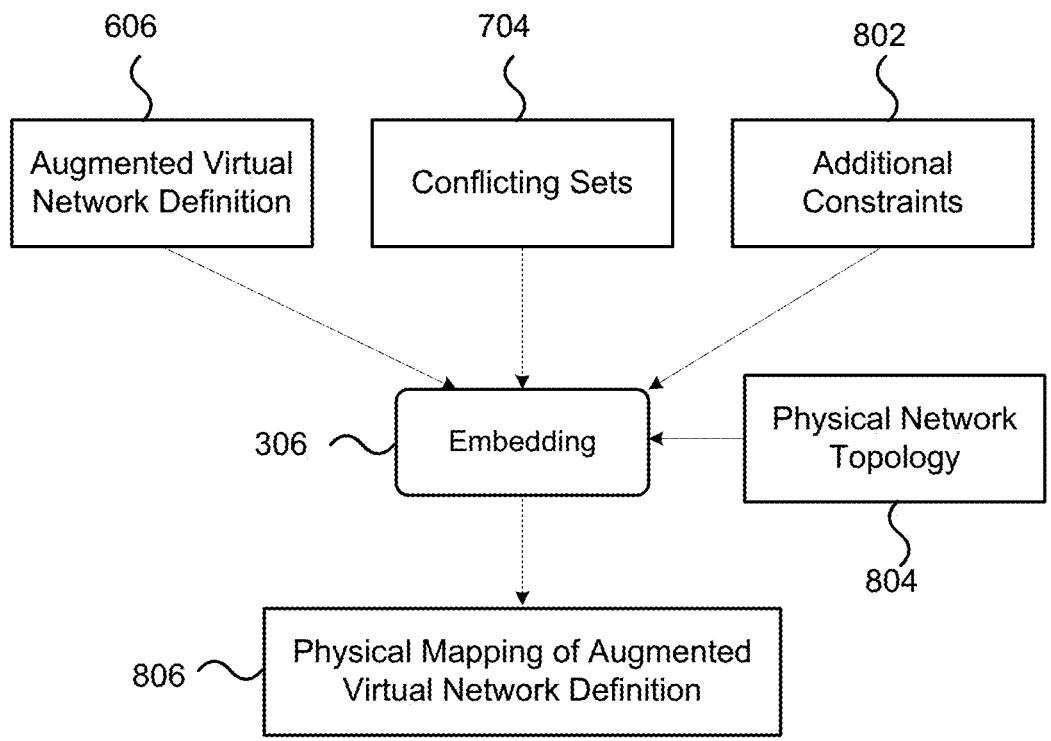
FIG. 8 depicts embedding a k-protected virtual network on a physical network.

FIG. 8 depicts embedding a k-protected virtual network. As depicted, the embedding functionality 306 may receive the augmented virtual network definition 606, which may have been augmented from a requested virtual network, and the conflicting link sets 704 that are to be embedded on a physical substrate network described by a physical network topology 804. Additional constraints 802 may also be specified, such as bandwidth requirements of links, cost functions of different links, as well as location constraints specifying constraints on where a virtual node can be embedded. The embedding functionality 306 determines a mapping 806 from the augmented virtual network definition 606 to the physical network topology 804 that satisfies the constraints. In particular, the embedding satisfies the constraints imposed by the conflicting link sets 704, which requires that all virtual links in the same conflicting link set are embedded on disjoint paths in the physical substrate network.

The embedding may be done using an integer linear programming (ILP) approach that minimizes the total cost of link embedding. The ILP formulation provides a number of decision variables, constraints and an objective function. Minimizing the objective function provides the virtual network embedding. The decision variables, constraints and objective function are described in the following.

Decision Variables

A virtual link is mapped to a non-empty set of physical links creating a physical path. The following decision variable is introduced to indicate the mapping between a virtual link $(\hat{u}, \hat{v}) \in \hat{E}$ and a physical link $(u, v) \in E$.

$$x_{uv}^{\hat{u}\hat{v}} = \begin{cases} 1 & \text{if } (\hat{u}, \hat{v}) \in \hat{E} \text{ is mapped to } (u, v) \in E, \\ 0 & \text{otherwise.} \end{cases}$$

The following decision variable represents the virtual node mapping:

$$y_{\hat{u}u} = \begin{cases} 1 & \text{if } \hat{u} \in \hat{V} \text{ is mapped to } u \in V, \\ 0 & \text{otherwise.} \end{cases}$$

Constraints

Types of constraints include link mapping constraints, node mapping constraints, and disjointness constraints.

Link Mapping Constraints:

$$\forall (\hat{u},\hat{v}) \in \hat{E}: \Sigma_{\forall (u,v) \in E} x_{uv}^{\hat{u}\hat{v}} \geq 1 \tag{1}$$

$$\forall (u,v) \in E: \Sigma_{\forall (\hat{u},\hat{v}) \in \hat{E}} x_{uv}^{\hat{u}\hat{v}} \times b_{\hat{u}\hat{v}} \leq b_{uv} \tag{2}$$

$$\forall \hat{u},\hat{v} \in \hat{V}, \forall u \in V: \Sigma_{\forall v \in N(u)} (x_{uv}^{\hat{u}\hat{v}} - x_{vu}^{\hat{u}\hat{v}}) = y_{\hat{u}u} - y_{\hat{v}u} \tag{3}$$

Every virtual link is mapped to a non-empty set of physical links by equation (1). Equation (1) also ensures that no virtual link is left unmapped. It is also necessary to ensure that the resources of the physical links are not over-committed, which is provided by equation (2). Finally, equation (3) makes sure that the in-flow and out-flow of each physical node is equal except at the nodes where the endpoints of a virtual link are mapped. This flow conservation constraint ensures a continuous path between the mapped endpoints of a virtual link.

Node Mapping Constraints:

$$\forall \hat{u} \in \hat{V}, \forall u \in V: y_{\hat{u}u} \leq l_{\hat{u}u} \tag{4}$$

where:

$$l_{\hat{u}u} = \begin{cases} 1 & \text{if } \hat{u} \in \hat{V} \text{ can be provisioned on } u \in V \\ 0 & \text{otherwise} \end{cases} \tag{5}$$

$$\forall u \in V: \sum_{\hat{u} \in \hat{V}} y_{\hat{u}u} \leq 1 \tag{6}$$

A virtual node should be mapped to exactly one node in the physical network according to the given location constraints of equation (5), which is ensured by equation (4). Equation (6) ensures that a physical node does not host more than one virtual node from the same virtual network request.

Disjointness Constraints:

The disjointness constraint requires that each virtual link in a conflicting link set does not share a physical link in the substrate network. This requirement is ensured by:

$$\forall (u,v) \in E, \forall (\hat{u},\hat{v}) \in \hat{E}, \forall (\hat{a},\hat{b}) \in \chi^{\hat{u}\hat{v}}:$$

$$x_{uv}^{\hat{u}\hat{v}} + x_{vu}^{\hat{u}\hat{v}} + x_{uv}^{\hat{a}\hat{b}} + x_{vu}^{\hat{a}\hat{b}} \leq 1 \tag{7}$$

Objective Function

It is desired to minimize the cost of provisioning bandwidth on the physical links. The cost associated with provisioning a unit of bandwidth on a physical link $(u, v)$ is $C_{uv}$. Accordingly, the following objective function will provide a solution for the embedding.

$$\text{minimize}(\Sigma_{\forall (\hat{u},\hat{v}) \in \hat{E}} \Sigma_{\forall (u,v) \in E} x_{uv}^{\hat{u}\hat{v}} \times C_{uv} \times b_{\hat{u}\hat{v}}) \tag{8}$$

Although the above ILP formulation will provide an optimal embedding of the protected virtual network, the computational complexity, and consequently the time required to determine the optimal embedding, may be prohibitive. A heuristic approach may be used to provide an acceptable solution in an acceptable amount of time, while satisfying the constraint that a virtual link and any other virtual link present in its conflicting set cannot share a physical link for their mapping.

Figure 9:
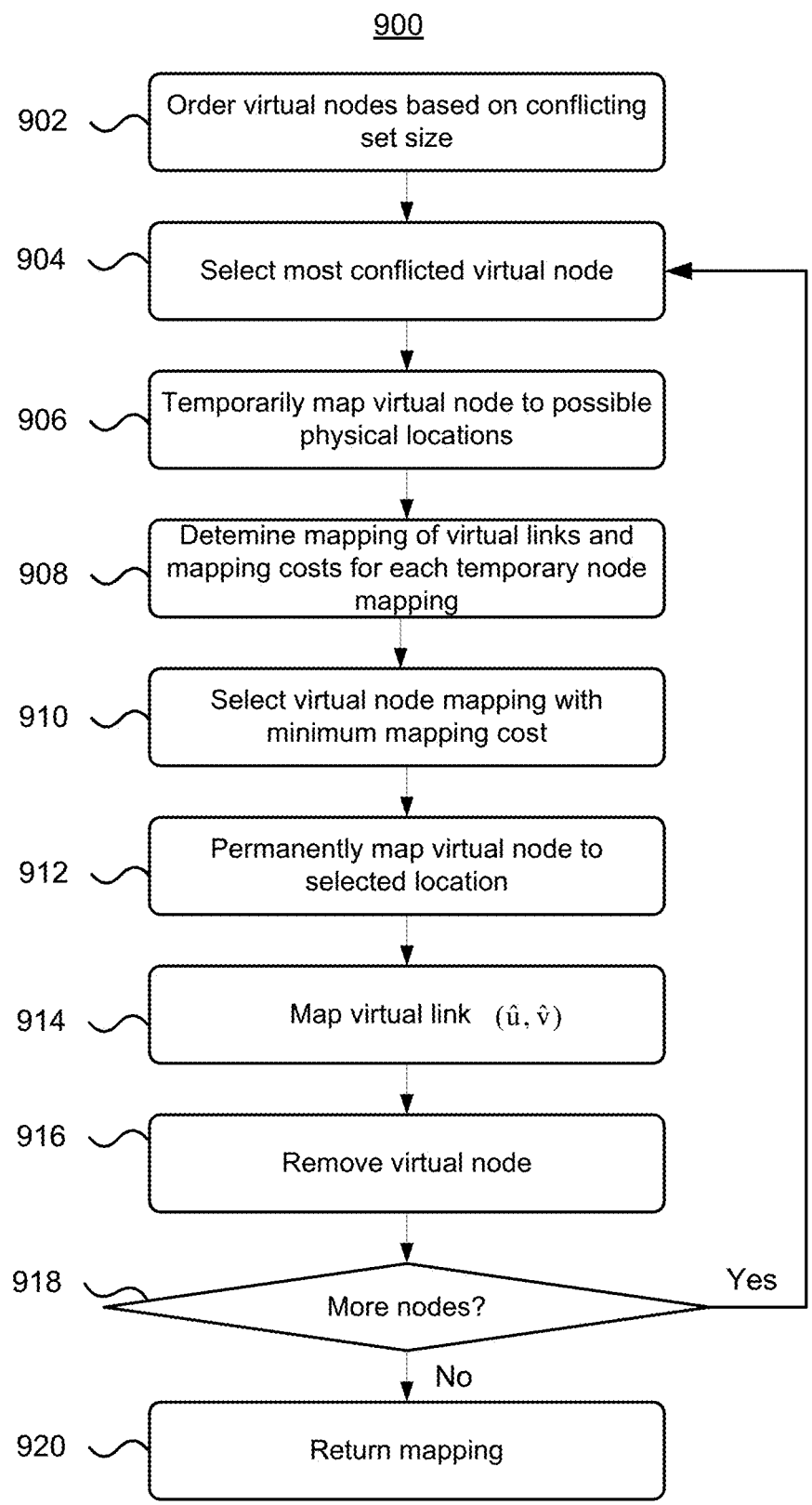
FIG. 9 depicts a heuristic method for mapping an augmented virtual network definition to a physical network.

FIG. 9 depicts a heuristic method 900 for mapping the augmented virtual network definition to a physical network. Although the ILP embedding may provide an optimal embedding, its performance does not scale well with the size of the virtual network and physical network. In order to provide acceptable performance as network size, both the size of the requested virtual network and the physical substrate network, increases, a heuristic embedding approach may be used. The heuristic method 900 can provide an embedding that is acceptably close to the optimal embedding, while running in a relatively short amount of time even for large network sizes.

The heuristic method 900 for the connectivity aware virtual network embedding may begin by a step 902 of sorting the virtual nodes into a sorted list $\hat{\mathcal{V}}$, in terms of the sum of conflicting link set sizes associated with the virtual links incident upon each virtual node. Since the conflicting link sets present constraints on the physical implementation, it may be beneficial to map the virtual links with the largest conflicting sets first, that is the most conflicted virtual links are embedded first. The heuristic method 900 iterates over all of the nodes in the ordered list of virtual nodes. For each iteration, the most conflicted virtual node $\hat{u}$ in the sorted list is selected in a step 904, and for each physical node x that the selected virtual node can be mapped to, which is provided by the virtual node's location constraint set, the virtual node $\hat{u}$ is temporarily mapped to x in a step 906. With $\hat{u}$ temporarily mapped to x, the virtual links $(\hat{u}, \hat{v})$ in $\hat{E}$ are mapped to physical paths in the substrate network in a step 908, for example using a virtual link mapping function. The cost of the virtual link mapping is determined and compared to a current minimum mapping cost, and the minimum mapping cost is updated if the current mapping has a lower cost. The node mapping $x_{min}$ having the lowest cost is tracked for the virtual link mapping for each temporary mapping of $\hat{u}$ to each possible physical node location x. Once all of the possible locations have been mapped, and the associated link mapping costs determined, the node mapping $x_{min}$ having the lowest cost is selected in a step 910 and is permanently mapped to the virtual node $\hat{u}$ in a step 912. The virtual link $(\hat{u}, \hat{v})$ is mapped in a step 914 to the previously-computed physical path for the mapping $x_{min}$ if both terminating virtual nodes $\hat{u}$ and $\hat{v}$ of the virtual link have already been permanently mapped to a physical node. The virtual node $\hat{u}$ is removed from the sorted list $\hat{\mathcal{V}}$ in a step 916 and, if there are no more virtual nodes to be mapped (No at 918), the mapping may be returned in a step 920. If there are additional nodes (Yes at 918) the most conflicted node of the remaining nodes in the sorted list may be selected and the process repeated.

The heuristic method 900 may be implemented in numerous different ways. One possible pseudo code implementation of the heuristic method 900 is provided below.

```
01:function VN-EMBEDDING (G, Ĝ)
02:    V̂←Sort û ∈ V̂ in decreasing order of Σ∀v̂∈N(û)|χûv̂|
03:    for all û ∈V̂ do
04:        Candidate← Ø
05:        for all l ∈ L (û) do
06:            Temporarily add mapping from û to l in f
07:            ε ←Sort (û, v̂) ∈ Ê in decreasing order of |χûv̂|
08:            ∀(û, v̂) ∈ ε such that g (û, v̂) = Ø:
09:                P [(u, v)] ← VLINK - MAP (G, Ĝ, (û, v̂))
10:            if Σ∀(u,v)∈ε cost (P [(û, v̂)]) is minimum then
11:                M ← P, Candidate← l
12:            end if
13:            f(û) ← Ø and ∀(û, v̂) ∈ ε g(û, v̂) ← Ø
14:        end for
15:        if Candidate≠ Ø then
16:            add mapping from û to Candidate in f
17:            ∀(û, v̂) ∈ ε and f(û) ≠ Ø and f(v̂) ≠ Ø:
18:                add mapping from (û, v̂) to M [(û, v̂)] in g
19:        else
20:            return No Solution Found
21:        end if
22:    end for
23:    return {f, g}
24:end function
```

The following pseudo-code listing provides one possible implementation of the function VLINK-MAP called by the VN-EMBEDDING function.

```
01:function VLINK-MAP (G, Ĝ, (û, v̂))
02:    pûv̂ ← Ø
03:    ∀(ŝ, t̂) ∈ χûv̂:
04:        E ← E - {(a, b) ∈ E|(ŝ, t̂) is mapped to (a, b)}
05:    if f(û) ≠ Ø∧ f(v̂) ≠ Ø then
06:        Dijkstra-Shortest-Path (G, f(û))
07:        Qf(û)f(v̂) ←Shortest cost path from f(û) to f(v̂) in G
08:    else if f(x̂) = Ø∧ f(ŷ) ≠ Ø s.t. x̂, ŷ ∈ {û, v̂}, ŷ ≠ x̂ then
09:        Dijkstra-Shortest-Path (G, f(ŷ))
10:        Qf(û)f(v̂) ←Shortest cost path from L(x̂) to f(ŷ) in G1
11:    end if
12:    if Qf(û)f(v̂) ≠ Ø then
13:        Temporarily add mapping from (û, v̂) to Qf(û)f(v̂) in g
14:    end if
15:return Qf(û)f(v̂)
16:end function
```

The VLINK-MAP function computes two functions, $f$ and g for mapping all the virtual nodes and virtual links of Ĝ in a coordinated manner. As there is no cost associated with virtual node mapping, a virtual link mapping that minimizes total cost determines the virtual node mapping. The VLINK-MAP function first sorts the virtual nodes $\hat{u} \in \hat{\mathcal{V}}$ in decreasing order of the sum of conflicting set's sizes for each virtual link incident on $\hat{u}$. This sorted list of virtual nodes is represented by $\hat{\mathcal{V}}$. Since a virtual node having virtual links with larger conflicting sets becomes too constrained to be mapped to a suitable physical node in the substrate network, the function tries to map virtual nodes in the order of $\hat{\mathcal{V}}$.

For each virtual node $\hat{u} \in \hat{\mathcal{V}}$, the VN-EMBEDDING function searches for an unallocated physical node in virtual node $\hat{u}$'s location constraint set, L($\hat{u}$), which yields a feasible mapping while minimizing the cost. The inner loop in the VLINK-MAP function (Lines 5-14) maps a virtual node $\hat{u}$ temporarily to a physical node, l∈L($\hat{u}$), and tries to embed all the virtual links incident to $\hat{u}$. The VLINK-MAP function is invoked to find the mapping for each such virtual link. The virtual links incident to $\hat{u}$ are processed in the decreasing order of their conflicting sets' sizes, as the substrate paths need to satisfy disjointness constraint enforced by the conflicting sets. The VN-EMBEDDING function finally embeds the virtual node $\hat{u}$ to the physical node l that leads to a feasible mapping for all the virtual links incident to $\hat{u}$ and yields the minimum embedding cost. The VN-EMBEDDING function fails, if no such feasible l is found for a $\hat{u}$. Once a virtual node $\hat{u}$ has been finally mapped, the VN-EMBEDDING function creates the final mapping for only those virtual links incident to û whose both endpoints are already finally mapped (Line 17-18). The mappings of other virtual links incident on û are finalized when their unmapped endpoints are finally mapped. The VN-EMBEDDING function terminates after all the virtual nodes and virtual links of $\hat{G}$ have been finally mapped.

The VLINK-MAP function, which is invoked by the VN-EMBEDDING function, finds the mapping of a virtual link (û, v̂). The function removes all the physical links used by the mapping of all the virtual links in $\chi^{\hat{u}\hat{v}}$ to satisfy the disjointness constraint (Line 3-4). Then, a mapping for (û, v̂) is computed considering either of the following two cases: (i) both endpoints of (û, v̂) have already been mapped to some physical nodes $f(u)$ and $f(\hat{v})$, respectively. In this case, a minimum cost path $Q^{f(\hat{u}),f(\hat{v})}$ between $f(\hat{u})$ and $f(\hat{v})$ in G is computed. In the second case (ii) only û (or v̂) is mapped and the other endpoint v̂ (or û) has not been mapped. In this case, the Vlink-Map function computes the minimum cost path $Q^{f(\hat{u}),f(\hat{v})}$ between $f(\hat{u})$ (or $f(\hat{v})$) and all possible locations of the unmapped virtual node v̂ (or û) using Dijkstra's shortest path algorithm on G that uses $C_{f(\hat{u}),f(\hat{v})} \times b_{\hat{u}\hat{v}}$ as the virtual link mapping cost. After finding the minimum cost path, the Vlink-Map function temporarily maps (û, v̂) to $Q^{f(\hat{u}),f(\hat{v})}$ and adds it to g (Line 13).

The most computationally expensive step of the VN-Embedding function is the VLINK-MAP function, which invokes Dijkstra's shortest path algorithm on the physical substrate network requiring O(|E|+|V| log|V|) time. Since the VLINK-MAP function is invoked O(|V̂|||L(û)||N(û)|) times, the running time of the VN-EMBEDDING function becomes O(|V̂|||L(û)||N(û)|(|E|+|V| log|V|)).

As described above, the connectivity aware virtual network embedding comprises a conflicting set determination stage and an embedding stage. Each stage may be performed in different ways. The performance of different computation strategies were compared. In particular the use of the heuristic approach for determining the conflicting link sets was compared to determining the conflicting link set as an optimal cut-set. For the embedding stage, an ILP approach was compared to the heuristic approach described above. Further, failures against both single and double failures was compared. Further, a baseline virtual network embedding with no protection against failures in the physical layer using a multi-commodity unsplittable flow (MCUF) ILP approach was compared. The following table summarizes the different algorithms compared.

TABLE 1

Table of compared embedding approaches

| Notation | Failures | Disjointness | Embedding |
|---|---|---|---|
| S-CoViNE | Single | Heuristic | Heuristic |
| D-CoViNE | Double | Heuristic | Heuristic |
| S-CoViNE-ILP | Single | Heuristic | ILP (eq. 8) |
| D-CoViNE-ILP | Double | Heuristic | ILP (eq. 8) |
| S-Cutset-ILP | Single | Optimal cut-set | ILP |
| ViNE-ILP | None | None | MCUF ILP |

The ILP models were implemented using IBM™ I LOG CPLEX C++ library. The simulations were performed on a server with a quad-core 3.4 GHz processor and 8 GB of RAM. Both large and small scale network topologies were simulated. Virtual networks for the small scale scenario were 2-edge connected, as required by the cut-set based approach.

The following table summarizes the different scenarios and parameters used as well as the particular FIGS. depicting the associated results.

TABLE 2

Table of simulation parameters

| Scenario | FIG. | Physical Nodes | Physical Links | Virtual Nodes | Virtual Links |
|---|---|---|---|---|---|
| Small Scale | 10, 11 | 150 | 310 | 4-20 | 5-37 |
|  | 12, 13 | 50-250 | 105-494 | 10 | 17-24 |
| Large Scale | 14, 15 | 500 | 2017 | 10-100 | 21-285 |
|  |  | 1000 | 4023 | 10 | 21-285 |
|  | 16 | 500 | 2017 | 10 | 11-31 |
|  |  | 1000 | 4023 | 10 | 11-31 |
|  | 17 | 500 | 1000-2000 | 10 | 21 |
|  |  | 1000 | 2000-4000 | 10 | 21 |
| Failure | 18-21 | 150 | 310 | 10 | 11-31 |

Figure 10:
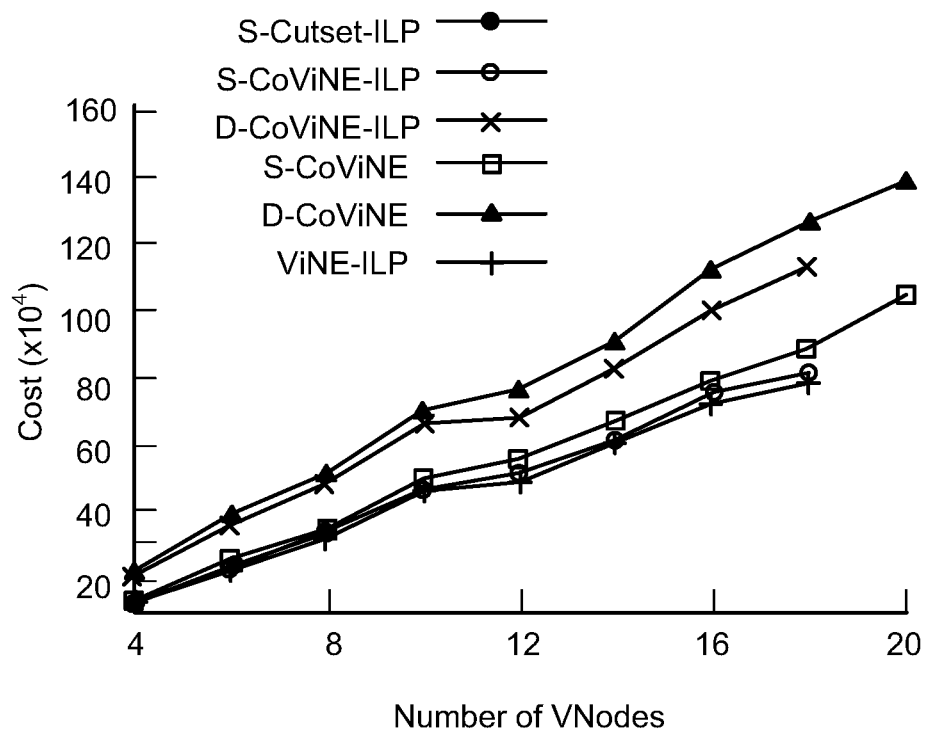
FIGS. 10 and 11 depict embedding costs for different small scale virtual network and physical network sizes.
Figure 11:
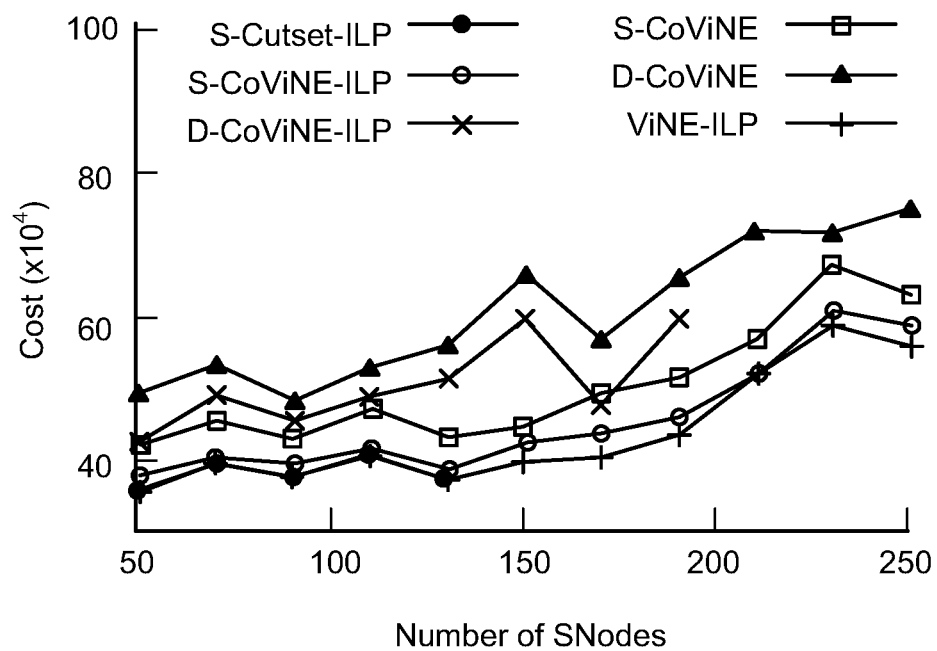

FIGS. 10 and 11 depict embedding costs for different small scale virtual network and physical network sizes. ViNE-ILP produces the lowest cost embedding, since it neither augments any parallel virtual links nor satisfies any disjointness constraint. The costs of embedding produced by S-Cutset-ILP and S-CoViNE-ILP lie very close to that of ViNE-ILP. Since the virtual networks are 2-edge connected in this scenario, no parallel link augmentation is performed. The difference in SCutset-ILP and S-CoViNE-ILP is only due the variation of the disjointness computation methods. In contrast, S-CoViNE employs the heuristic approaches for disjointness computation and embedding, resulting in ~10% higher cost than S-CoViNE-ILP and ~15% higher cost than the cut set based optimal solution (S-Cutset-ILP). Both D-CoViNE-ILP and D-CoViNE incur ~30% higher cost than single failure approaches, since they augment parallel virtual links to ensure 3-edge connectivity. In general, cost increases almost linearly with increase in physical network size for a fixed virtual network, and vice versa.

Figure 12:
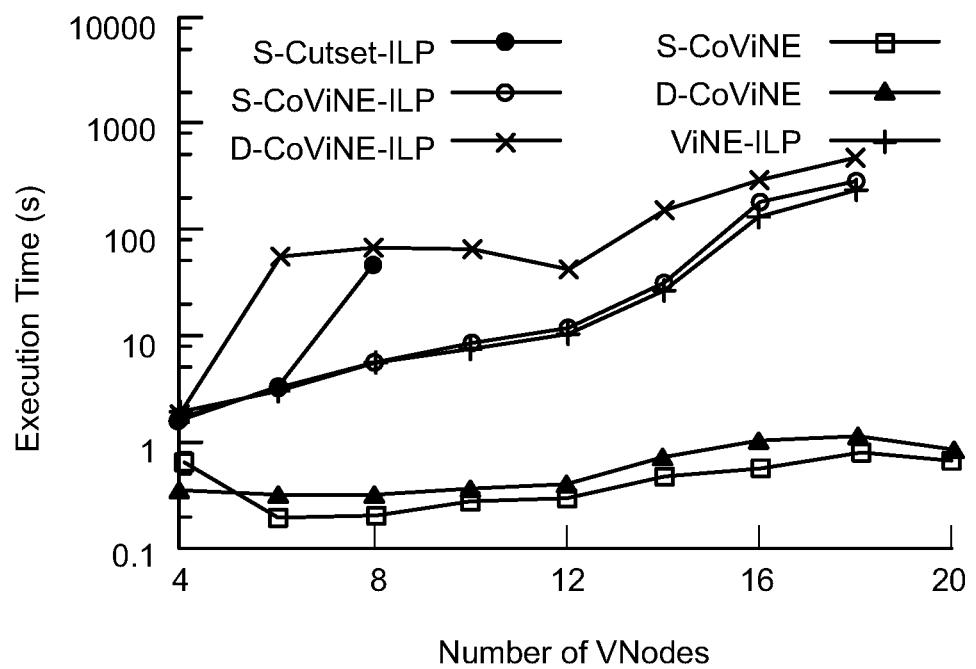
FIGS. 12 and 13 depict execution times in logarithmic scale for different small scale virtual network and physical network sizes.
Figure 13:
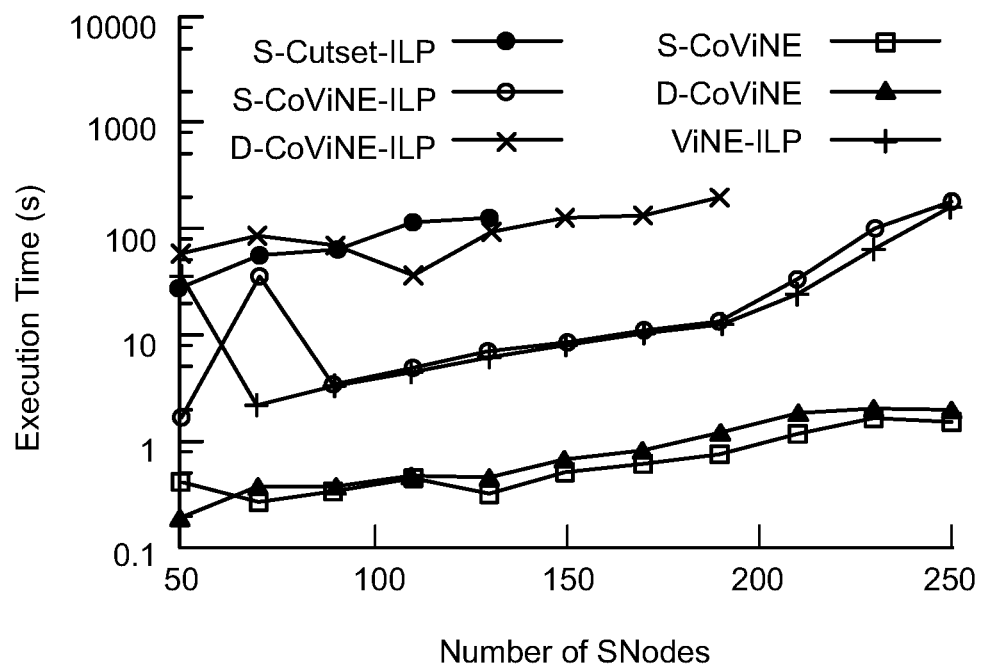

FIGS. 12 and 13 depict execution times in logarithmic scale for different small scale virtual network and physical network sizes, respectively. Execution times of S-CoViNE, that determines a 1-protected embedding capable of surviving a single physical link failure, and D-CoViNE, that determines a 2-protected embedding capable of surviving a double physical link failure vary approximately linearly with virtual network or physical network sizes. When embedding a virtual network of 18 virtual nodes on a 150 node physical network, S-CoViNE-ILP and D-CoViNE-ILP take ~285 s and ~456 s, respectively, which is significantly slower compared to the execution time of less than 1 second for S-CoViNE and D-CoViNE. ViNE-ILP runs faster than S-CoViNE-ILP and D-CoViNE-ILP, since it does not satisfy any disjointness constraint while embedding. S-Cutset-ILP is the slowest since it computes an optimal solution.

S-CoViNE and D-CoViNE can scale with arbitrary virtual network and physical network sizes, whereas the ILP-based approaches can only scale up to 18 node virtual networks on 150 node physical networks. Scalability of S-Cutset-ILP is the worst as it cannot scale beyond 10 node virtual networks on a 150 node physical networks. The higher costs of S-CoViNE and D-CoViNE, compared to the corresponding ILP based approaches, are compensated by their higher scalability and faster execution time.

Figure 14:
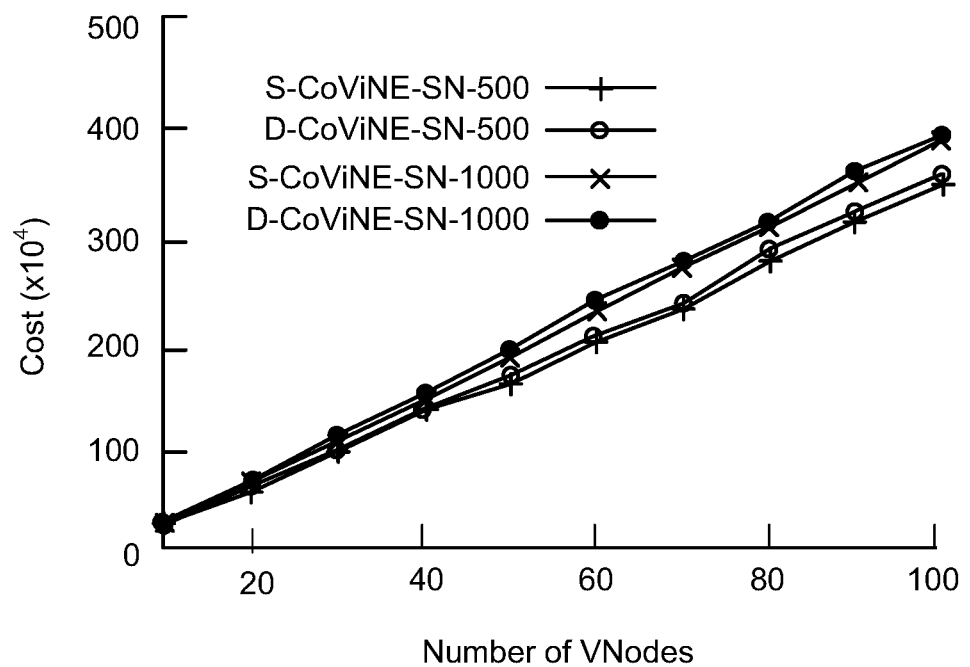
FIG. 14 depicts embedding cost by varying virtual network sizes on physical networks.
Figure 15:
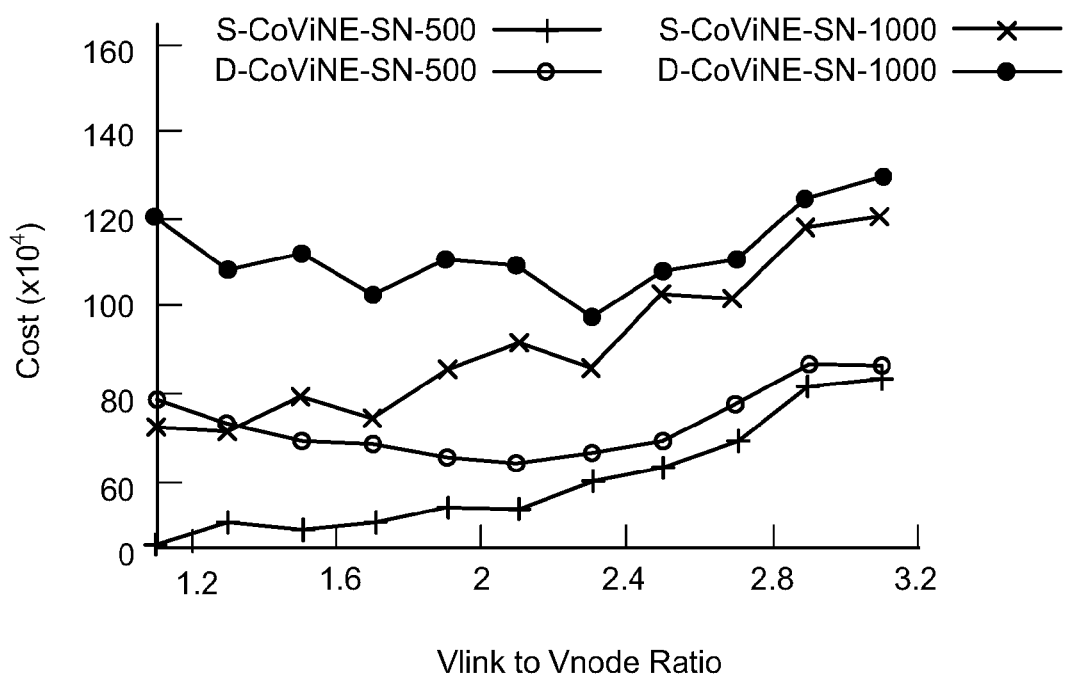
FIGS. 15 and 16 depict embedding cost for virtual network and physical network topologies with different link-to-node ratios.
Figure 16:
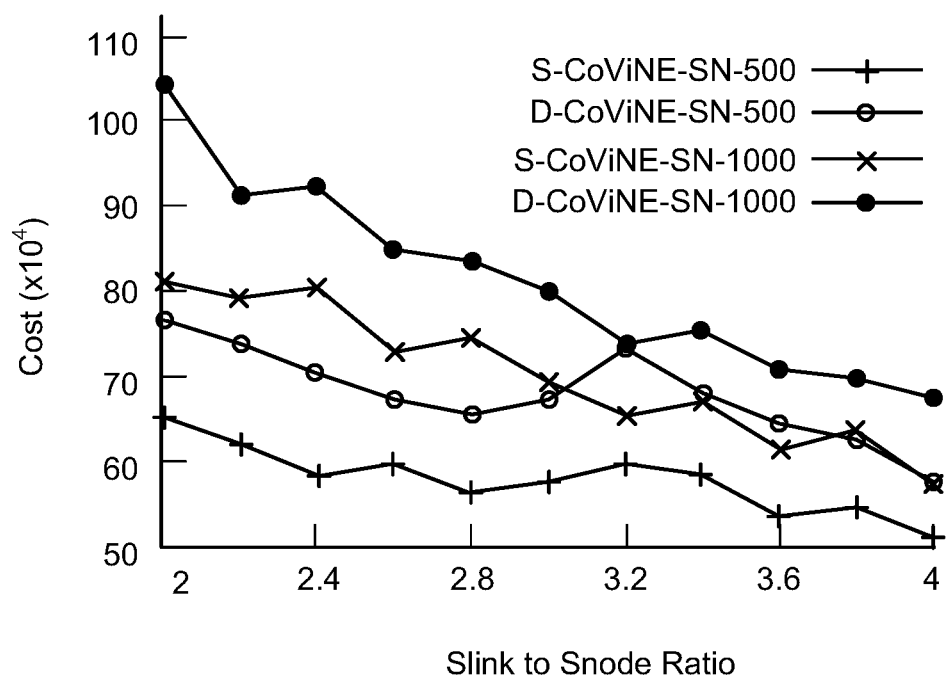

FIG. 14 shows embedding cost by varying virtual network sizes on physical networks of 500 (S-CoViNE-SN-500 and D-CoViNE-SN-500) and 1000 nodes (S-CoViNE-SN-1000 and D-CoViNE-SN-1000). FIGS. 15 and 16 show embedding cost for virtual network and physical network topologies with different link-to-node ratios (LNRs), respectively. In this scenario, embedding cost is mostly influenced by disjointness constraint and parallel virtual link augmentation. For double failure scenarios, augmentation cost dominates for LNR≤2.4, hence the initial decrease in embedding cost. However for LNR>2.4, cost for ensuring the disjointness constraint dominates, which justifies the corresponding increase in FIG. 15. For S-CoViNE, disjointness constraint dominates and embedding cost increases as higher number of virtual links are embedded on the same physical network for larger LNR. An increase in physical network LNR results into higher path diversity in physical network. S-CoViNE and D-CoViNE exploit this path diversity by finding shorter paths while embedding a virtual link. This accounts for the decrease in cost with an increase in physical network LNR.

Figure 17:
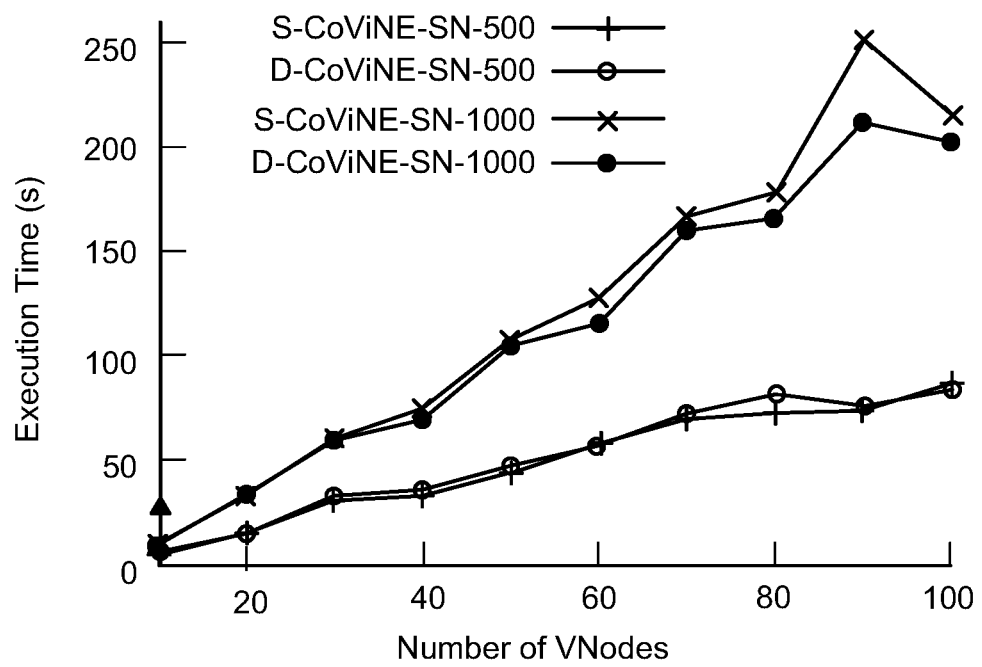
FIG. 17 depicts the execution times for S-CoViNE and D-CoViNE embedding algorithms.

FIG. 17 depict the execution times for S-CoViNE and D-CoViNE, which increase with both virtual network and physical network sizes.

In simulating the impact of failures, three different traffic classes were assumed, labeled as 1 (highest priority), 2 and 3 (lowest priority) demanding 20%, 30%, and 50% of each virtual link's bandwidth, respectively. Failures were handled by rerouting traffic in the affected virtual links along alternate shortest paths in the virtual network. Bandwidth sharing along these paths follow fair sharing policy between traffic from the same class and weighted fair sharing across different traffic classes.

Figure 18:
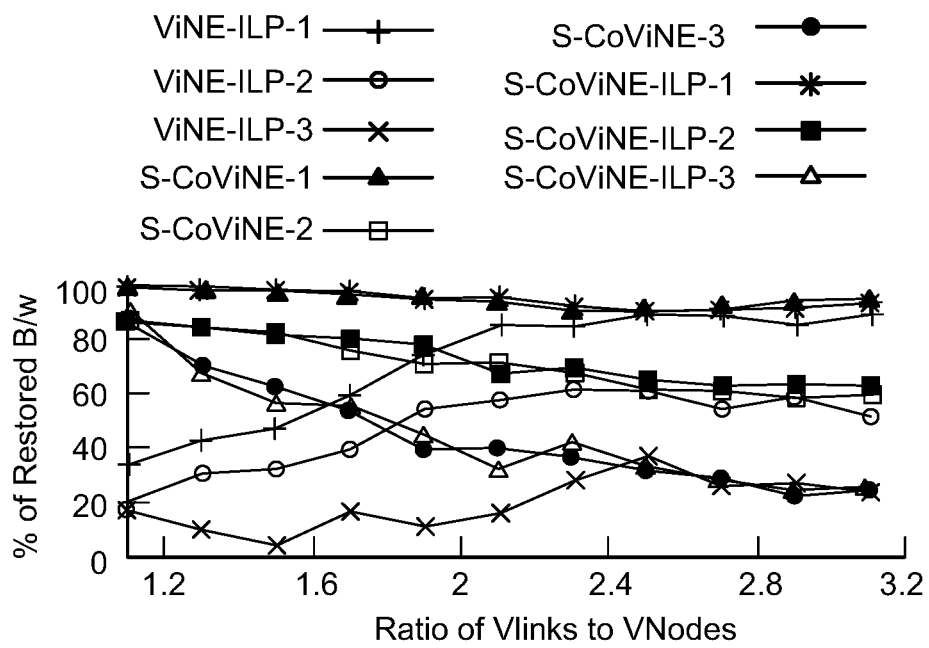
FIGS. 18 and 19 depict the percentage of restored bandwidth for single and double failure scenarios.
Figure 19:
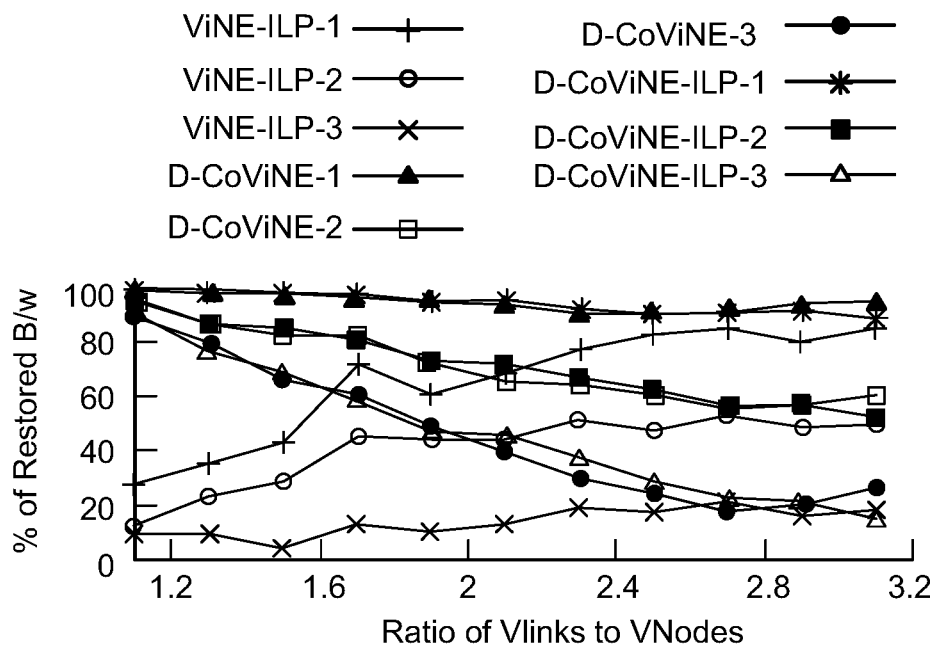
Figure 20:
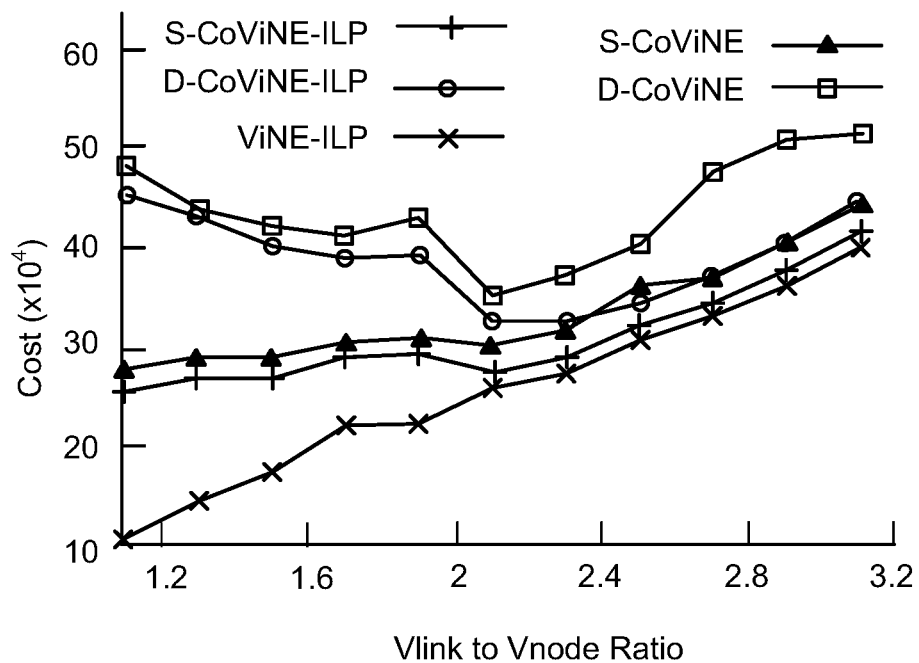
FIGS. 20 and 21 depict the overhead for ensuring connectivity in terms of embedding cost and number of augmented virtual links.
Figure 21:
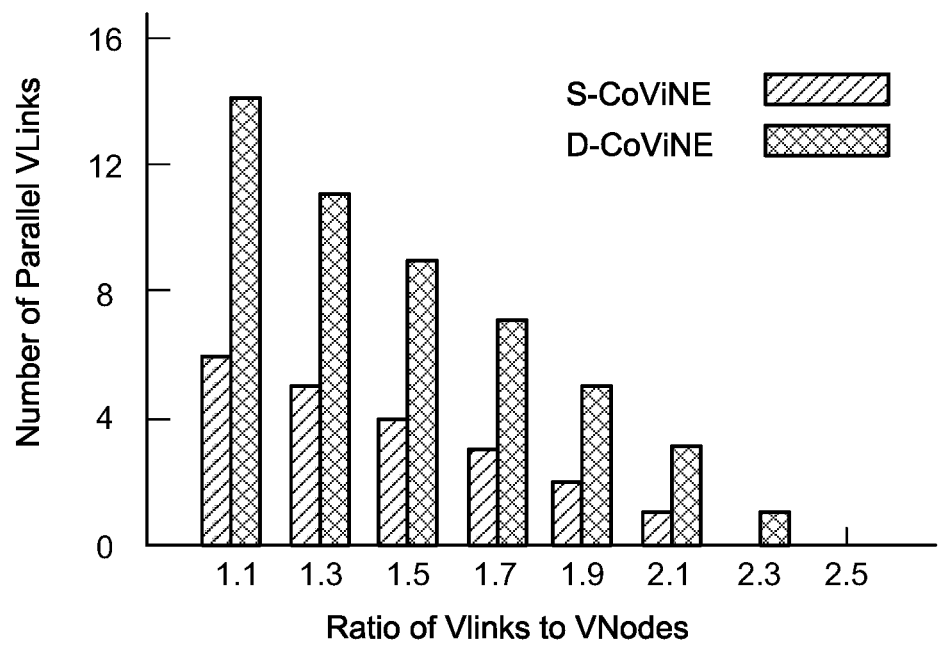

FIGS. 18 and 19 present the percentage of restored bandwidth for single and double failure scenarios, respectively. FIGS. 20 and 21 present the overhead for ensuring connectivity in terms of embedding cost and number of augmented virtual links, respectively.

The above has described connectivity-aware virtual network embedding. The embedding may allow a virtual network to be implemented that can sustain 2, or more if desirable, physical link failures without losing connectivity of the virtual network. The connectivity-aware virtual network embedding may provide fast execution even when a large number of virtual nodes and virtual links are present in the requested virtual network. In addition to providing a desirable mapping, i.e. one that can sustain multiple, i.e. k, simultaneous physical link failures without partitioning the virtual network, the speed and scalability of the heuristic approach for the connectivity-aware virtual network embedding may be useful in providing other features such as real-time or near real-time provisioning of virtual networks which may provide an improved user experience. Further real-time or near-real time calculation of the mapping for virtual networks may allow re-arrangement of existing virtual networks to improve the physical resource efficiency. Additionally, the virtual network embedding has been described as being determined for an existing physical network. It is possible to utilize the virtual network embedding to identify possible augmentations to existing physical infrastructure based on the determined mapping.

What is claimed is:

1. A method for embedding a virtual network definition defining a virtual network comprising a plurality of virtual nodes and a plurality of virtual links on a physical network, the method comprising:
    determining a conflicting set for each virtual link of the virtual network definition, each conflicting set comprising a plurality of virtual links of the virtual network that must be embedded on disjoint paths in the physical network to maintain connectivity of the virtual network in the presence of k physical link failures; and
    embedding the virtual network onto the physical network so that each of the plurality virtual links in each conflicting set are embedded on disjoint paths of the physical network.

2. The method of claim 1, further comprising augmenting the virtual network definition by adding parallel virtual links between virtual nodes so that each of the virtual nodes comprises at least k+1 virtual links.

3. The method of claim 2, wherein the parallel virtual links are added when determining the conflicting set for each virtual link.

4. The method of claim 3, wherein augmenting the virtual network definition and determining the conflicting set comprises:
    selecting an initial virtual node as a protected component;
    selecting a virtual node outside of the protected component having a virtual link to a virtual node inside the protected component;
    attempting to determine k+1 edge-disjoint shortest paths from the protected component to the selected virtual node;
    if k+1 edge-disjoint shortest paths are determined:
        adding the selected virtual node to the protected component;
        updating the conflicting set of the virtual link between the selected virtual node and the virtual node inside the protected component to include all virtual links in the k+1 edge-disjoint shortest paths; and
        removing all of the virtual links in the k+1 edge-disjoint shortest paths from further consideration in augmenting the virtual network definition and determining the conflicting set;
    if k+1 edge-disjoint shortest paths are not determined:
        adding n parallel virtual links between the selected virtual node and the virtual node inside the protected component to provide k+1 edge-disjoint shortest paths, where n=k+1−(number of determined edge-disjoint shortest paths);
        adding the selected virtual node to the protected component;
        updating the conflicting set of the virtual link between the selected virtual node and the virtual node inside the protected component to include all virtual links in the determined edge-disjoint shortest paths and the n parallel virtual links; and
        removing all of the virtual links in the determined edge-disjoint shortest paths and the n parallel virtual links from further consideration in augmenting the virtual network definition and determining the conflicting set; and
    selecting a next virtual node outside of the protected component having a virtual link to a virtual node inside the protected component.

5. The method of claim 1, wherein determining the conflicting set for each of the virtual links comprises determining the conflicting set for each of the virtual links using an optimal cut-set approach.

6. The method of claim 1, wherein determining the embedding comprises using an integer linear programming (ILP) formulation to determine the embedding.

7. The method of claim 1, wherein determining the embedding comprises using a heuristic approach to determine the embedding.

8. The method of claim 7, wherein the heuristic approach comprises:

sorting in decreasing order the virtual nodes according to a sum of conflicting set size of each virtual link incident upon the respective virtual node; and mapping virtual nodes and virtual links of the virtual network definition to the physical network beginning with the virtual nodes having the largest sum of conflicting set size.

9. The method of claim 8, wherein each virtual link incident upon a virtual node is mapped to the physical network in a decreasing order of the conflicting set size of each one of the virtual links.

10. The method of claim 1, further comprising receiving the virtual network definition as a virtual network request for embedding onto a physical network.

11. A system for embedding a virtual network comprising a plurality of virtual nodes and a plurality of virtual links on a physical network, the system comprising:

a processing unit for executing instructions; and a memory unit for storing instructions, which when executed by the processor configure the system to perform steps for:

determining a conflicting set for each virtual link of a virtual network definition defining the virtual network, each conflicting set comprising a plurality of virtual links of the virtual network that must be embedded on disjoint paths in the physical network to maintain connectivity of the virtual network in the presence of k physical link failures; and embedding the virtual network onto the physical network so that each of the plurality virtual links in each conflicting set are embedded on disjoint paths of the physical network.

12. The system of claim 11, wherein the instructions configure the system to further perform steps for augmenting the virtual network definition by adding parallel virtual links between virtual nodes so that each of the virtual nodes comprises at least k+1 virtual links.

13. The system of claim 12, wherein the parallel virtual links are added when determining the conflicting set for each virtual link.

14. The system of claim 13, wherein augmenting the virtual network definition and determining the conflicting set comprises:

selecting an initial virtual node as a protected component;

selecting a virtual node outside of the protected component having a virtual link to a virtual node inside the protected component;

attempting to determine k+1 edge-disjoint shortest paths from the protected component to the selected virtual node;

if k+1 edge-disjoint shortest paths are determined:

adding the selected virtual node to the protected component;

updating the conflicting set of the virtual link between the selected virtual node and the virtual node inside the protected component to include all virtual links in the k+1 edge-disjoint shortest paths; and removing all of the virtual links in the k+1 edge-disjoint shortest paths from further consideration in augmenting the virtual network definition and determining the conflicting set;

if k+1 edge-disjoint shortest paths are not determined:

adding n parallel virtual links between the selected virtual node and the virtual node inside the protected component to provide k+1 edge-disjoint shortest paths, where n=k+1−(number of determined edge-disjoint shortest paths);

adding the selected virtual node to the protected component;

updating the conflicting set of the virtual link between the selected virtual node and the virtual node inside the protected component to include all virtual links in the determined edge-disjoint shortest paths and the n parallel virtual links; and removing all of the virtual links in the determined edge-disjoint shortest paths and the n parallel virtual links from further consideration in augmenting the virtual network definition and determining the conflicting set; and selecting a next virtual node outside of the protected component having a virtual link to a virtual node inside the protected component.

15. The system of claim 11, wherein determining the conflicting set for each of the virtual links comprises determining the conflicting set for each of the virtual links using an optimal cut-set approach.

16. The system of claim 11, wherein determining the embedding comprises using an integer linear programming (ILP) formulation to determine the embedding.

17. The system of claim 11, wherein determining the embedding comprises using a heuristic approach to determine the embedding.

18. The system of claim 17, wherein the heuristic approach comprises:

sorting in decreasing order the virtual nodes according to a sum of conflicting set size of each virtual link incident upon the respective virtual node; and mapping virtual nodes and virtual links of the virtual network definition to the physical network beginning with the virtual nodes having the largest sum of conflicting set size.

19. The system of claim 18, wherein each virtual links incident upon a virtual node are mapped to the physical network in a decreasing order of the conflicting set size of each of the virtual links.

20. The system of claim 11, wherein the instructions configure the system to further perform steps for receiving the virtual network definition as a virtual network request for embedding onto the physical network.

* * * * *